United States Patent
Dvorkis

(10) Patent No.: US 6,648,228 B2
(45) Date of Patent: *Nov. 18, 2003

(54) BAR CODE READER WITH AN INTEGRATED SCANNING COMPONENT MODULE MOUNTABLE ON PRINTED CIRCUIT BOARD

(75) Inventor: Paul Dvorkis, Stony Brook, NY (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/353,444

(22) Filed: Jan. 29, 2003

(65) Prior Publication Data

US 2003/0136844 A1 Jul. 24, 2003

Related U.S. Application Data

(60) Continuation of application No. 09/542,381, filed on Apr. 4, 2000, which is a division of application No. 09/045,427, filed on Mar. 20, 1998, now Pat. No. 6,186,400.

(51) Int. Cl.[7] .................................................. G06K 7/10
(52) U.S. Cl. ........................... 235/462.43; 235/462.45; 235/472.01
(58) Field of Search ........................... 235/454, 462.43, 235/462.45, 472.01

(56) References Cited

U.S. PATENT DOCUMENTS

| | | | | |
|---|---|---|---|---|
| 5,262,627 A | * | 11/1993 | Shepard | 235/462.36 |
| 5,280,164 A | * | 1/1994 | Barkan | 235/462.21 |
| 5,288,985 A | * | 2/1994 | Chadima et al. | 235/462.45 |
| 5,468,949 A | * | 11/1995 | Swartz et al. | 235/472.01 |
| 6,015,091 A | * | 1/2000 | Rockstein et al. | 235/472.01 |
| 6,308,892 B1 | * | 10/2001 | Swartz et al. | 235/472.01 |
| 6,321,990 B1 | * | 11/2001 | Giordano et al. | 235/472.01 |

* cited by examiner

Primary Examiner—Michael G. Lee
Assistant Examiner—April Nowlin
(74) Attorney, Agent, or Firm—Kirschstein, et al.

(57) ABSTRACT

A bar code reader has an integrated scanning component module which is mountable on a printed circuit board. In one embodiment, the module may include the digitizer/decoder electronics, enabling the module to be used with a generic PCB. In some embodiments, the module includes a high speed optical scanning arrangement having an optical element which extends longitudinally of a flexible member, secured at one end. In other embodiments, the invention extends to a hand-held optical scanner having a scanning assembly, detector and data transmission coupling all mounted to a common printed circuit board, preferably located within a manually-graspable handle. In yet a further embodiment, an abuse-detector or accelerometer is provided for determining when the device is exposed to deceleration above a predetermined limit, and optionally for automatically shutting down applications programs and for providing a black-box-record of a short time frame before the device was exposed to an unexpected shock. Preferably, the reader is shock protected by a thermo-plastic elastomer housing section. An outgoing light beam is directed at a non-orthogonal angle relative to the PCB.

15 Claims, 18 Drawing Sheets

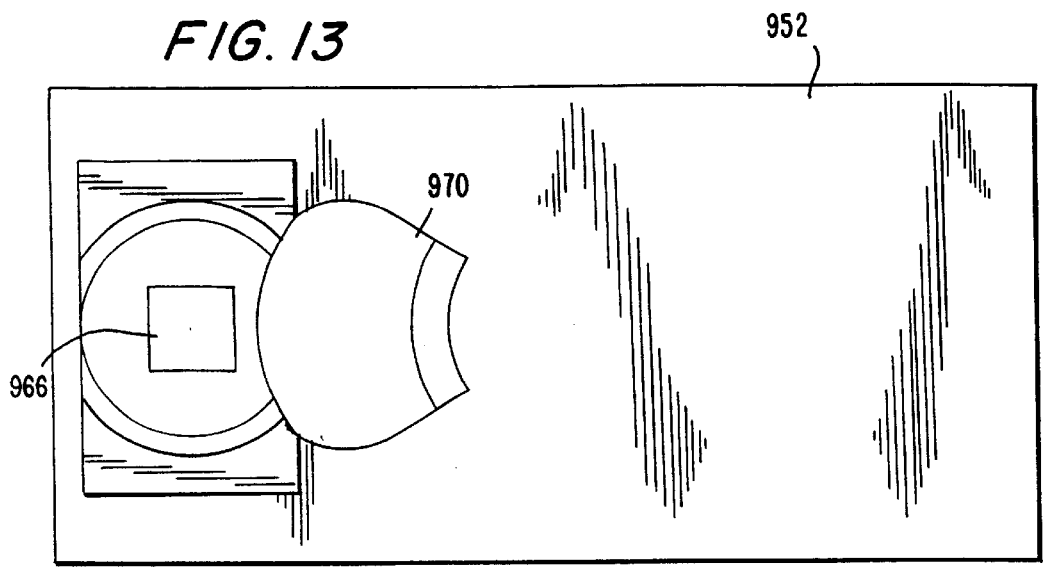
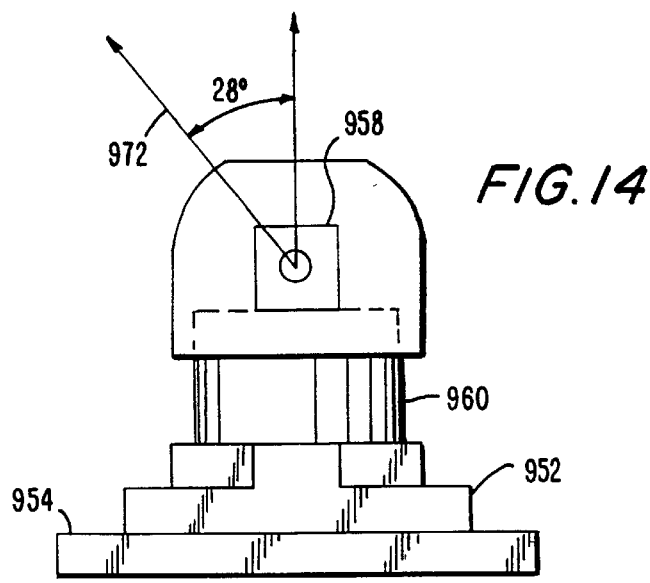

BAR CODE READER WITH AN INTEGRATED SCANNING COMPONENT MODULE MOUNTABLE ON PRINTED CIRCUIT BOARD

CROSS REFERENCE TO RELATED APPLICATIONS

This application is a continuation of U.S. Pat. application Ser. No. 09/542,381, filed Apr. 4, 2000, which is a division of U.S. Ser. No. 09/045,427, filed Mar. 20, 1998, now U.S. Pat. No. 6,186,400.

BACKGROUND OF THE INVENTION

1. Field of the Invention

The present invention relates generally to a high-speed scanning arrangement, and particularly although not exclusively to such a scanning arrangement for use in hand-held or fixed optical scanners such as bar code scanners. In one embodiment the invention relates to a bar code reader with an integrated scanning component module mountable on a printed circuit board.

2. Description of the Related Art

Various optical readers and optical scanners have been developed heretofore to optically read bar code symbols applied to objects in order to identify the object by optically reading the symbol thereon. The bar code symbol itself is a coded pattern comprised of a series of bars of various widths and spaced apart from one another to bound spaces of various widths, the bars and spaces having different light reflecting properties. The readers and scanners electro-optically decoded the coded patterns to multiple digit representations descriptive of the objects. Scanners of this general type have been disclosed, for example, in U.S. Pat. Nos. 4,251,798; 4,360,798; 4,369,361; 4,387,297; 4,593,186; 4,496,831; 4,409,470; 4,808,804; 4,816,661; 4,816,660; and 4,871,904, all of said patents having been assigned to the same assignee as the instant invention and being hereby incorporated herein by reference.

As disclosed in the above-identified patents and applications, a particularly advantageous embodiment of such a scanner resided, inter alia, in emitting a light beam, preferably a laser beam, emitted from a light source, preferably a gas laser or a laser diode, and in directing the laser beam to a symbol to be read. En route to the symbol, the laser beam was directed to, and reflected off, a light reflector of a scanning component. The scanning component moved the reflector in a cyclical fashion and caused the laser beam to repetitively scan the symbol. The symbol reflected the laser beam incident thereon. A portion of the incident light reflected off the symbol was collected and detected by a detector component, e.g. a photodiode, of the scanner. The photodiode had a field of view, and the detected light over the field of view was decoded by electrical decode circuitry into data desciprive of the symbol for subsequent processing. The cyclically movable reflector swept the laser beam across the symbol and/or swept the field of view during scanning.

U.S. Pat. Nos. 4,387,297 and 4,496,831 disclose a high speed scanning component including an electric motor operative for reciprocatingly oscillating a reflector in opposite circumferential directions relative to an output shaft of the motor. Electrical power is continuously applied to the motor during scanning. The light beam which impinges on the light reflector is rapidly swept across a symbol to be scanned in a predetermined cyclical manner. The scanning component comprises at least one scan means for sweeping the symbol along a predetermined direction (X-axis) lengthwise thereof. The scanning component may also comprise another scan means for sweeping the symbol along a transverse direction (Y-axis) which is substantially orthogonal to the predetermined direction, to thereby generate a raster-type scan pattern over the symbol. In addition to a single scan line and the raster-type pattern, other types of scan patterns are also possible, such as, x-shaped, Lissajous, curvilinear (see U.S. Pat. No. 4,871,904), etc. For example, if the X and Y axis scanning motors are both driven such that the light reflectors are driven at a sinusoidally-varying rate of speed, then the scan pattern at the reference plant will be a Lissajous-type pattern for omni-directional scanning of the symbols. The use of two separate scanning motors and control means to produce the multi-axis and omni-directional scanning pattern increases material and labor costs as well as the amount of electrical power needed to operate the scanner. In addition, the relatively complicated motor shaft and bearing arrangements of the scanning components may result in a useful life that is inadequate for some applications.

European patent application 456,095 also discloses various prior art types of high speed scanning arrangements, as do U.S. Pat. Nos. 5,280,165 and 5,367,151.

SUMMARY OF THE INVENTION

Objects of the Invention

It is a general object of the present invention to enhance the state-of-the-art of high speed scanning arrangements, and particularly although not exclusively for such arrangements for use in optical scanners for reading indicia of differing light reflectivity, particularly laser scanners for reading bar code symbols.

A further object of the present invention is to provide an inexpensive, robust and easily replaceable scanning arrangement.

Yet another object of the invention is to increase the working lifetime of the scanning components.

Yet another object is to provide a robust, low cost, hand-held optical scanner.

Yet a further object is to provide a means for determining when a scanner has been exposed to high levels of mechanical shock.

Yet a further object is to attempt to alleviate high levels of mechanical shock.

FEATURES OF THE INVENTION

According to one aspect of the invention, there is provided an optical scanning assembly including an optics module having an optical scanner and an optical detector for detecting light reflected from an indicia being read and for providing data signals representative thereof, and a printed circuit board (PCB) carrying electrical circuitry for controlling said optics module. A first electrical connector jointly movable with the optics module mates with a second electrical connector fixed to the PCB for electrically coupling the optics module and the PCB.

The electrical connectors may supply both power and control signals to the optics module, and may also operate to transfer the data signals from the optics module to the PCB. The electrical connection is conveniently of the plug-in type (for example, it maybe PCMCIA-compatible). In preferred embodiments, the electrical connectors act to mount the optics module on the PCB. Alternatively, the module may be otherwise secured to the PCB, with the electrical connectors acting simply to transfer power and/or data.

According to a further aspect of the present invention, there is provided a hand-held electronic device including an abuse-detector for determining when said device has been exposed to mechanical shock above a predetermined design limit.

The abuse-detector may conveniently be secured, for example by means of an adhesive, to a PCB of the electronic device. Preferred electronic devices include all types of portable and/or hand-held electronic equipment, including portable computer terminals, data entry devices, bar code readers, digital cameras and so on.

According to yet a further aspect of the present invention there is provided a hand-held electronic device including an accelerometer for determining when said device is exposed to acceleration above a predetermined limit and for producing a signal representative thereof, and a CPU for running an applications program, said CPU being arranged to shut down said applications program and to store related status information when said signal is received from said accelerometer.

The invention further extends to a method of determining when a hand-held electronic device is exposed to acceleration above a predetermined limit. Such a method preferably includes the step of producing a signal representative thereof, and closing down any active applications programs and storing related status information.

When it is determined that the device is being exposed to an acceleration above a predetermined limit, the CPU may enter a power-down mode. In addition, one or more mechanical protection devices may operate to prevent mechanical damage from the expected resultant shock. For example, mechanical protection may be applied, by means of a mechanical lock, shock absorbers, or the like, to prevent mechanical damage to the heads and/or platters of a disk drive.

In yet a further aspect of the invention there is provided a hand-held electronic device including an accelerometer having an accelerometer output, a deceleration-level detector for determining from said accelerometer output when said device has been exposed to a deceleration above a given value, and a store for storing for later analysis values representative of the accelerometer output for a time period prior to the deceleration-level detector determining that the device has been so exposed.

In yet another aspect there is provided a method of operating a hand-held electronic device, said device including an accelerometer having an accelerometer output and a store, the method comprising:

(a) Monitoring said accelerometer output, and determining when said device has been exposed to a deceleration greater than a given value; and (b) Storing in the store, for later analysis, values representative of the accelerometer output for a time period prior to the said determination.

Preferably, the accelerometer output is filtered or smoothed, before being applied to the deceleration-level detector. Means may then be provided, for example, a signal comparator, for determining when the deceleration level is sufficiently high. Once such a determination has been made, the prior output of the accelerometer (for example over the preceding five or ten seconds) is stored in memory for future analysis. Conveniently, an A/D converter is also provided, sampling the signal at sufficiently frequent intervals that future analysis may be carried out on the discrete digitized and stored values.

Separate x, y and z accelerometers may be provided, supplying respectively acceleration outputs in the x, y and z directions. Each output may be separately filtered and compared with a given acceleration level, thereby allowing separate triggering in each of the x, y and z channels. In addition, a separate channel may be provided for other status information, such as for example temperature information, on/off status information for the electronic device and so on. A further store may be provided for storing such information in the event that a deceleration is detected of a fixed limit.

The invention may be carried into practice in a number of ways and several specific embodiments will now be described, by way of example, with reference to the accompanying drawings, in which:

BRIEF DESCRIPTION OF THE DRAWINGS

FIG. 13 is a partial view from above of the module of FIG. 12;

FIG. 14 is a partial view from one end of the module of FIG. 12;

Figure 1A:
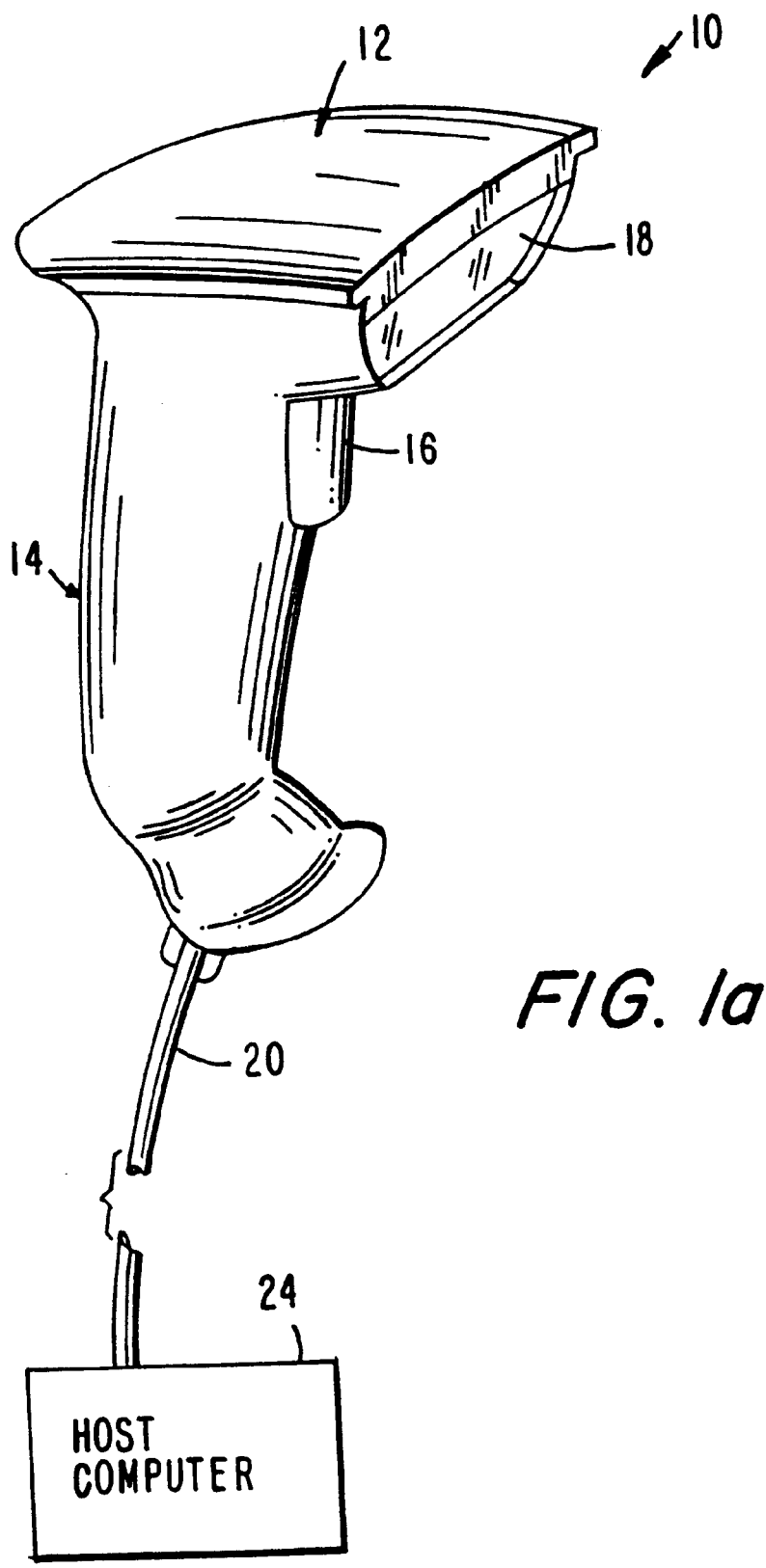
FIG. 1a is a perspective view of a hand-held optical scanner, suitable for use with the scanning arrangement of the present invention.

DETAILED DESCRIPTION OF THE PREFERRED EMBODIMENTS:

Referring now to the drawings, as shown in FIG. 1, reference numeral 10 generally identifies a hand-held scanner having a head 12 and an ergonomically-shaped handle 14. A manually-operable trigger 16 is situated below the head 12 on an upper, forwardly-facing part of the handle 14. As known from the above-identified patents incorporated by reference herein, a light source component, typically, but not necessarily, a laser, is mounted inside the head 12. The light source emits a light beam along a transmission path which extends outwardly through a window 18 that faces indicia, e.g. bar code symbols, to be read. Also mounted within the head is a photodetector component, e.g. a photodiode, having a field of view, and operative for collecting reflected light returning through the window 18 along a path from the symbol.

A scanner component (to be described in more detail with reference to FIG. 2) is mounted within the head 12, and is operative for scanning the symbol and/or the field of view of the photodetector. The scanner component includes at least one light reflector positioned in the transmission path and/or the return path. The reflector is driven in oscillatory fashion by an electricallyoperated drive, preferably at the resonant frequency of the scanner component, thereby producing a scanning light beam.

The photodetector generates an electrical analog signal indicative of the variable intensity of the reflected light. This analog signal is converted into a digital signal by an analog-to-digital converter circuit. This digital signal is conducted to a decode module (not shown) within the scanner. The decode module decodes the digital signal into data descriptive of the symbol and the data are passed out along an external cable 20 to an external host device 24, normally a host computer. Here the data are stored for further processing. Instead of the cable 20, the scanner 10 and the external host device 24 may be in communication by a wireless connection, e.g., a radio link.

In operation, each time a user wishes to have a symbol read, the user aims the head at the symbol and pulls the trigger 16 to initiate reading of the symbol. The trigger 16 is an electrical switch that actuates the drive means. The symbol is repetitively and rapidly scanned. As soon as the symbol has been successfully decoded and read, the scanning action is automatically terminated, thereby enabling the scanner to be directed to the next symbol to be read in its respective turn.

In addition, the head need not be a portable hand-held type, as fixedly mounted heads are also contemplated in this invention. Furthermore, scanners in accordance with the present invention may have manually operated triggers, or may alternatively be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

Figure 1B:
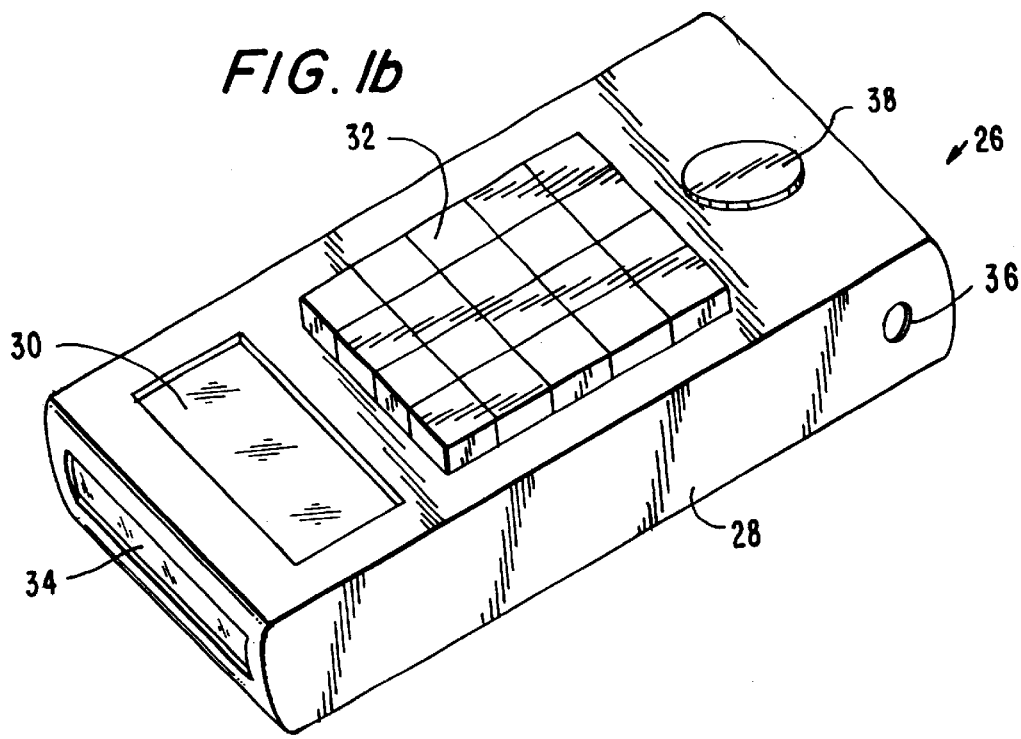
FIG. 1b is a perspective view of a hand-held data-entry/scanning terminal suitable for use with the scanning arrangement of the present invention.

Turning now to FIG. 1b, there is shown an alternative hand-held optical scanner, this time taking the form of a scanning terminal 26. The terminal comprises a hand-held case 28 having a data display screen 30 and a data input keypad 32. A high speed scanning arrangement within the case 28 produces a scanning light beam which extends outwardly through a window 34 which faces the indicia to be read. Light reflected from the indicia passes back through the window 34 and impinges on a photodetector component (not shown), for example a photodiode, which creates a returning light output signal. The information content within that signal may be stored in an on-board memory (not shown) or may be downloaded to a remote computer via a data port 36. Alternatively, the information may be transmitted via a radio frequency signal produced by an on-board radio transmitter/receiver 38.

Figure 2A:
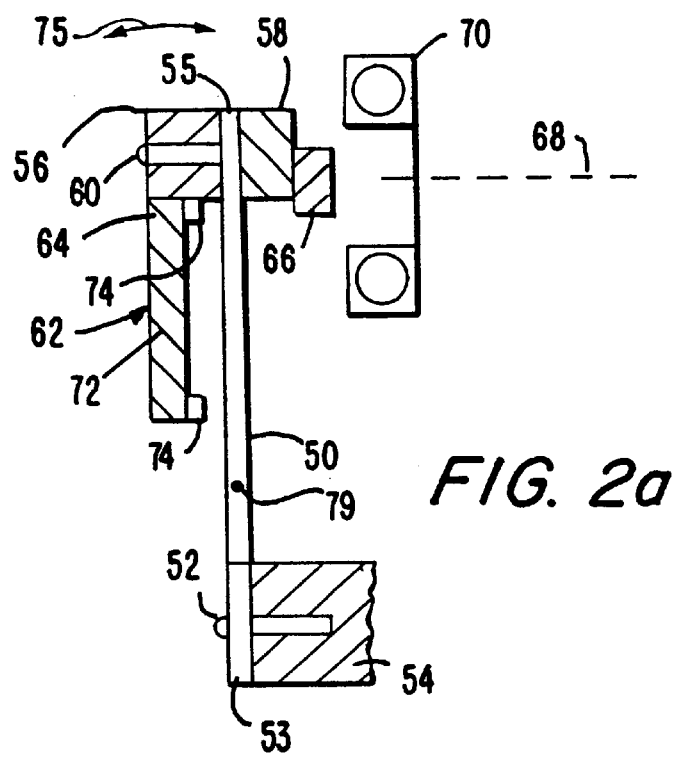
FIGS. 2a and 2b show an embodiment of a scanning arrangement according to the present invention.
Figure 2B:
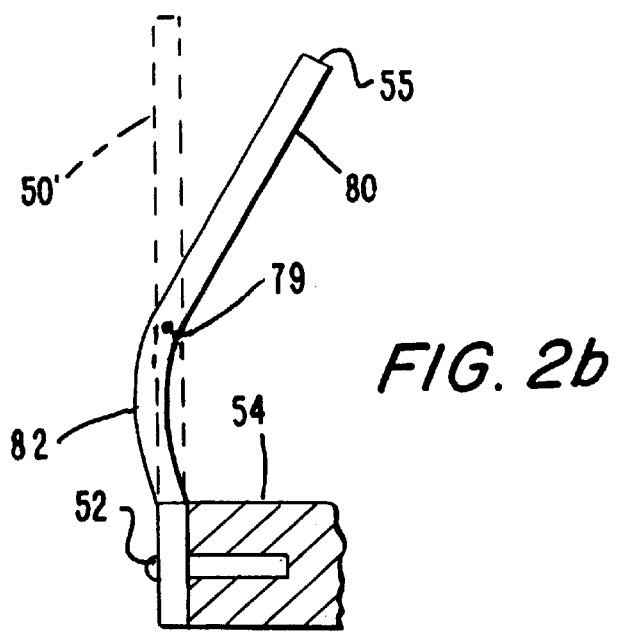

FIG. 2a shows an embodiment of a high speed scanning arrangement suitable for use with either of the optical scanners of FIGS. 1a and 1b. The arrangement has a flexible beam 50, one end 53 of which is fixedly mounted by means of a screw 52 to a base support 54. The beam 50 preferably comprises a generally planar leaf spring, which may be made of Mylar(™), a plastics material, metal, or any other convenient flexible material. At the distal end 55 of the beam 50 is a mounting bracket 56,58 which is secured to the beam by means of a further screw 60. Secured to one portion 56 of the mounting bracket is a generally rectangular mirror (62) having a reflective mirror surface 64. The mirror extends downwardly from the distal end 55 of the beam 50, generally parallel with the length of the beam, towards the other end of the beam 53.

Mounted to the second portion 58 of the mounting bracket, on the other side of the beam 50 from the mirror, is a permanent magnet 66. This is positioned generally on an axis 68 of an electromagnetic coil 70, but is mounted perpendicular to the axis to save space.

In operation, the coil 70 is driven either with a pulsed electrical signal, or an AC signal (eg.,a sine-wave signal), thereby creating a continuous or repetitive force on the magnet 66. The force repeatedly moves the magnet into and out of the coil 70, thereby flexing the beam 50 and causing oscillation of the mirror in the direction shown by the double-headed arrow 75. Alternatively, the force may be unidirectional only: for example a repeated pulse may draw the magnet into the coil, with the magnet moving in the other direction purely by virtue of the resilience of the beam 50. The perpendicular mounting of the magnet 66 means that it does not protrude beyond the coil 70 when the beam 50 bends to its fullest extent.

Preferably, the coil 70 is driven so that the scanning arrangement oscillates at a resonate frequency which is above the fundamental. The preferred mode of oscillation is a higher order mode, as is shown schematically in FIG. 2b. In this Figure, the dashed lines 50' represent the rest position of the beam 50, and the solid lines represent one of the instantaneous positions of the beam during oscillation. For the sake of clarity, the mirror and mounting bracket are omitted, and the amount of curvature is exaggerated. In this preferred embodiment, the beam is caused to oscillate in such a way that there is a fixed node or axis 79 approximately one third of the way along its length. The portion of the beam 80 above this point bends as shown, as does the portion 82 between the axis 79 and the base support 54: however, the node 79 remains substantially stationary. Other modes of oscillation, other than the fundamental, could also be used, depending upon the oscillation frequency required. The exact frequency will of course depend upon the size and mass of the components, but in the preferred embodiment the frequency may for example be between 100 and 200 Hz; or it could be greater than 200 Hz.

By mounting the mirror 62 to the distal end 55 of the beam, and arranging for it to extend downwardly, parallel to the beam, the mirror center of mass 72 may be brought close to the node 79. This allows for high speed scanning to take place without unduly stressing the beam 50. As will be appreciated, the mirror 62 is effectively oscillating about a nominal rotation axis which is coincident with the node 79.

Since the mirror 62 and the magnet 66 are rigidly coupled together, they oscillate as one unit, which simplifies the drive signal control.

To further reduce stress on the beam 50, the mounting bracket 56,58 and the permanent magnet 66 are both made relatively small and light in comparison with the mirror. The fact that the magnet is small, and positioned far away from the nominal rotation axis 79, allows the coil 70 to provide enough rotational moment for the start-up time to be extremely rapid (less than 50 milliseconds).

The relative lengths and masses of the beam 50 and the mirror 62 may be adjusted, as will be evident to the skilled man in the art, to provide the required frequency of oscillation. If necessary, additional weights 74 may be secured to the mirror, thereby bringing the overall center of mass 72 close to the nominal axis of rotation.

In alternative embodiments (not shown) the mirror 64 could be replaced with any other suitable optical arrangement for diverting a light beam. For example, instead of the light beam being reflected from the mirror surface 62, it could instead be diverted by passing through a lens, a prism, a diffraction grating, or a holographic optical element. Also, the mirror 62 could be replaced with a solid state laser, the scanning motion of the beam being caused by oscillation of the laser itself.

Figure 3:
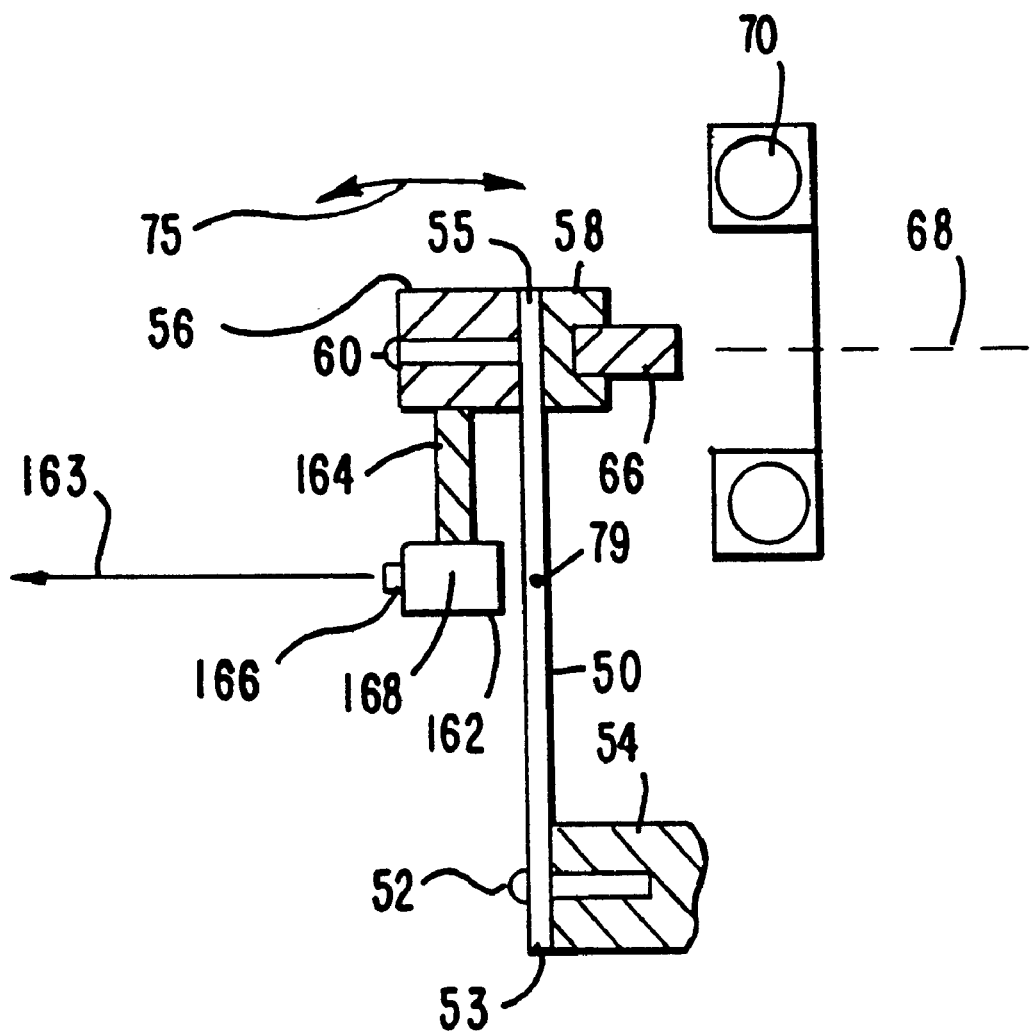
FIG. 3 shows another embodiment.

This last arrangement is shown schematically in FIG. 3, in which like elements are given like reference numerals. In this embodiment, the mirror 62 is replaced with a solid state laser 162 which is mounted to the mounting bracket 56 by a rigid elongate support 164, extending longitudinally of the beam 50. The laser 162 includes beam-shaping optics and a stop 166, and produces an output beam 163. In use, as the beam 50 oscillates (as shown schematically in FIG. 2b) the laser 162 also oscillates, thereby causing a scanning motion of the laser beam 163. The scanning frequency may be high (for example between 100 and 200 Hz) because of the close proximity of the nominal axis of rotation (the node 79) and the center of mass 168 of the laser 162. Preferably, the support 164 is light but rigid so that it does not affect substantially the position of the center of mass of the support/laser assembly.

The embodiment of FIG. 3 may be used in combination with the embodiment of FIG. 2a, in optical series, to provide the capability of two dimensional scanning. Alternatively, the embodiment of FIG. 3 may be used in conjunction with any other known method of one dimensional scanning.

Also, two high speed scanning arrangements of FIG. 2 may be used together, in optical sequence, to create a beam which scans in more than one direction. In that way, high speed multi-axis scan patterns may be produced across the indicia to be read. Alternatively, the high speed scanning arrangement of FIG. 2 may be used in association with other known (one-dimensional) scanning arrangements to produce a similar effect.

In either arrangement, the drive signal applied to the coil 70 preferably causes continued oscillation at the required frequency. Alternatively, however, a single pulse or drive signal could be applied to the coil, simply starting the oscillation off, with the scan element then coming naturally to rest in a damped manner.

Either of the embodiments of FIGS. 2 or 3 may be manufactured as a self-contained scan module or element which may be mounted as a unit within any type of handheld or fixed optical scanner, for example those shown in FIGS. 1a or 1b. In such a modular scanning arrangement, the base support 54 may comprise part of the optical scanner casing, as shown for example at reference numeral 12 in FIG. 1a or reference numeral 28 in FIG. 1b. In such an arrangement, the coil 70 may also be directly mounted to the casing (with the coil therefore not forming part of the replaceable module). Alternatively, the base support 54 of FIGS. 2 and 3 may comprise a common mounting bracket to which is secured not only the beam 50, but also the coil 70. In that arrangement, the coil 70 forms part of the replaceable module, and is secured to the casing along with the other scanning components via the intermediary of the support bracket 54.

Figure 4A:
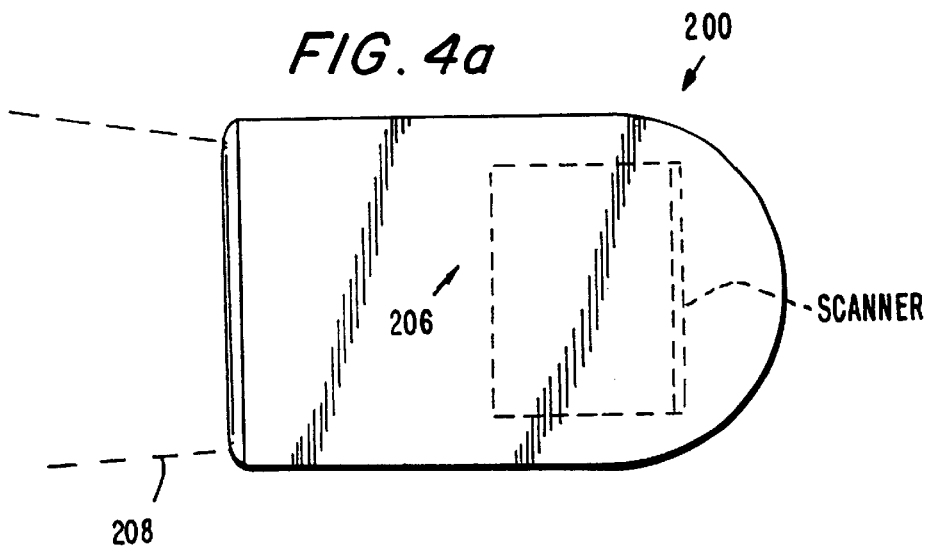
FIGS. 4a and 4b are top and side views, respectively, of an alternative low-cost hand-held scanner.
Figure 4B:
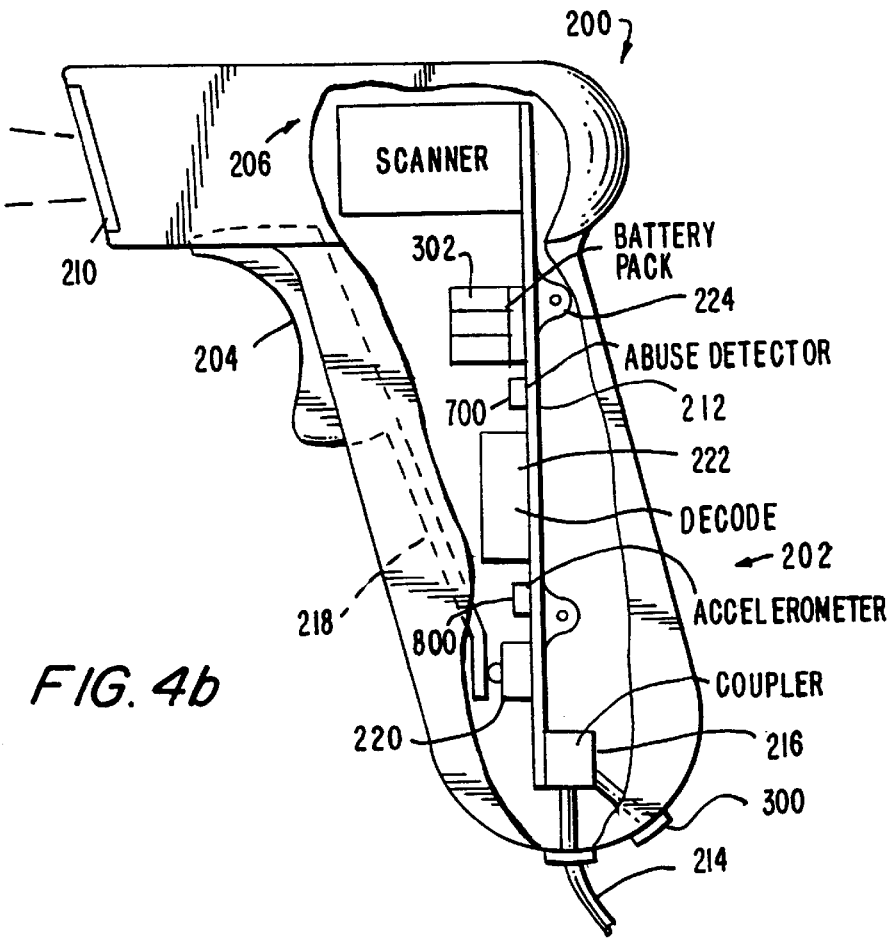

FIGS. 4a and 4b show respectively top and side views of a low cost housing within which the previously described scanning arrangements may be incorporated.

The housing of FIG. 4 comprises a head portion 200 and a manually-graspable handle portion 202 having a trigger 204 which can be operated by the user's finger. A scanning mechanism generally indicated at 206 is located in the head portion, and provides a scanning laser beam indicated by the dotted lines 208 which leaves the scanner via a window 210.

The scanning mechanism 206 is surface-mounted to an elongate printed circuit board (PCB) 212 which extends downwardly into the handle. Power and/data transfer capabilities are provided via an external lead 214 which couples to the PCB via a suitable power and/data transfer coupling 216 at the lower end of the board. The trigger 204 has, within the handle, an elongate metal tongue 218 which, when the trigger is pressed, applies force to an ON/OFF micro-switch 220 on the PCB.

The PCB may, in addition, include decode electronics 222 providing for in-housing decoding of bar code symbols or other indicia which are being read by the scanner.

Preferably, all of the mechanical and/or electronic components within the housing, apart from those associated with the trigger 204 and the tongue 218, are surface mounted to the PCB. The PCB is then simply secured to the housing by screws or other appropriate couplings 224,226.

Instead of or in addition to the data cable 214, the scanner may be provided with a radio communications link 300. In such a case, power may be provided not via an external lead but rather by an on-board battery pack 302.

In one preferred embodiment, the scanning mechanism 206 may be of the type shown in FIG. 2a or of the type shown in FIG. 3. In an alternative embodiment, the mechanism may be of the type now to be described with reference to FIG. 5a.

Figure 5A:
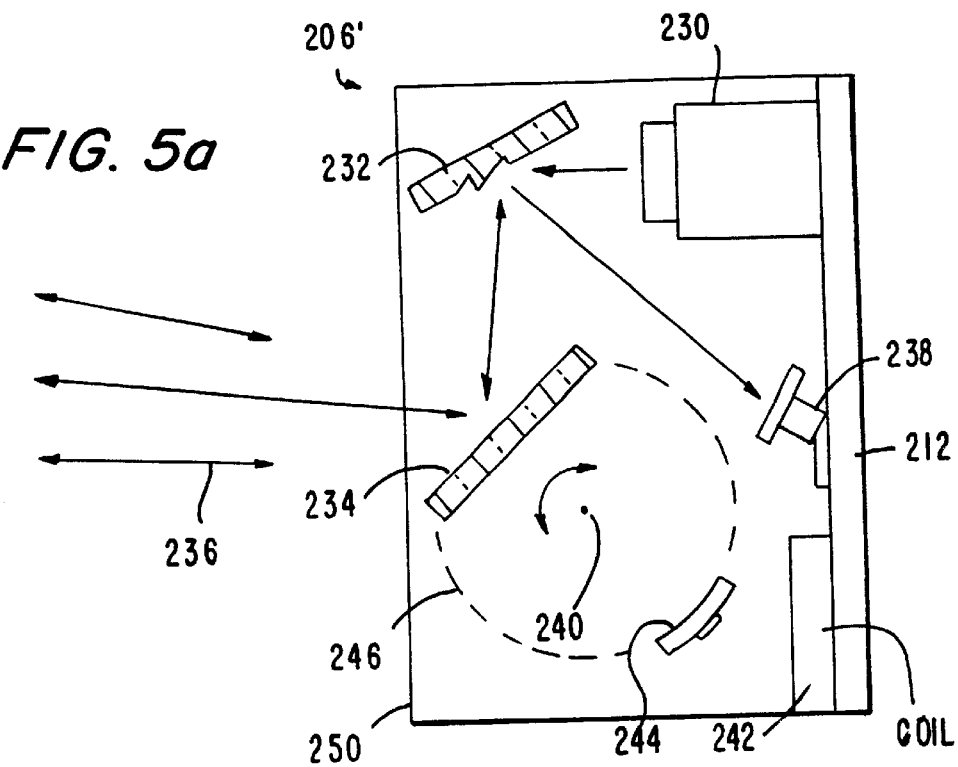
FIGS. 5a and 5b are, respectively, views from above and to the side of the scanning mechanism for use in the embodiment of FIGS. 4a and 4b.

In FIG. 5a, the scanning mechanism 206' includes a laser diode 230 that produces an outgoing laser beam which is reflected from a collection mirror 232 onto an oscillating scanning mirror 234 to produce an outgoing scanning beam 236. Light reflected from the indicia (not shown) being scanned impinges first on the scanning mirror 234, then on the collection mirror 232 from which it is reflected to a photodiode or other photodetector 238. The photodetector produces an electrical output signal which travels via the PCB to the PCB electronics 222 (FIG. 4b).

The scanning mirror 234 is caused to oscillate back and forth about an axis 240 by means of a drive signal applied to a coil 242. This interacts with a magnet 244 on a rotating member 246 to which the mirror 234 is also secured.

Figure 5B:
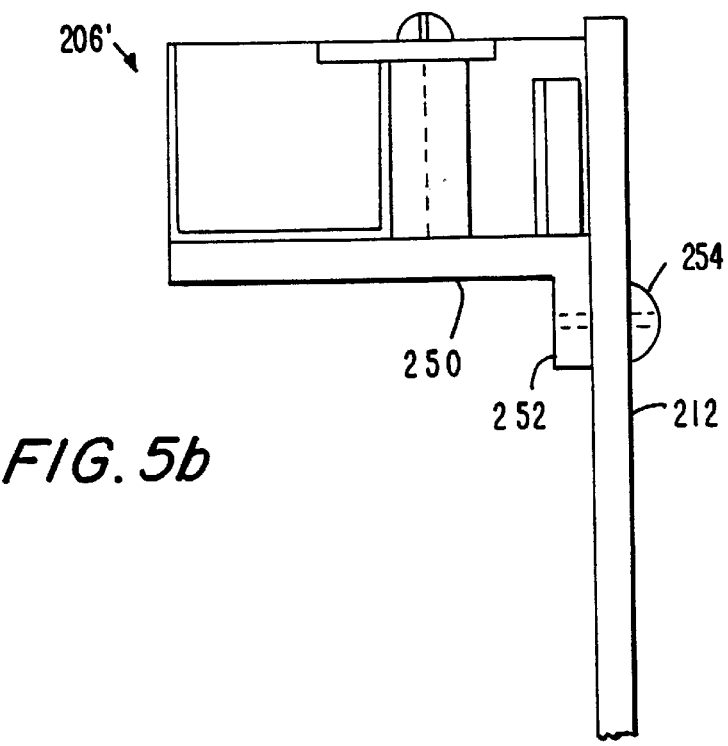

As best shown in FIG. 5b, the scanning mechanism is secured to the PCB 212 by means of an angled mounting bracket 250. A flange 252 of the mounting bracket is secured to the PCB by one or more screws 254.

Figure 12:
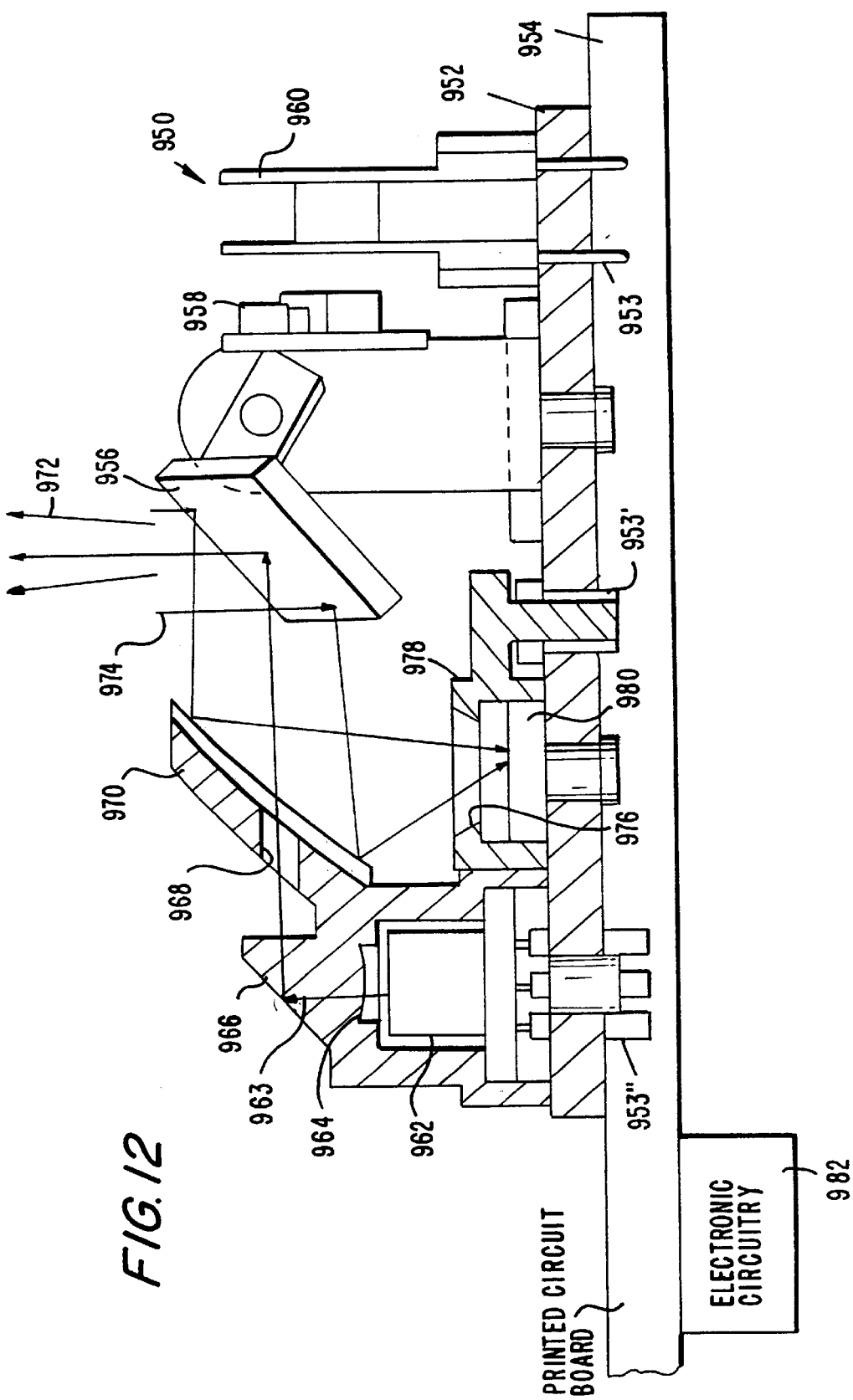
FIG. 12 is a partial section through an optics module according to a further embodiment of the invention.

An alternative module design is shown in FIGS. 12 to 14. In this design, a small optics module carries the mechanical and optical elements, with the majority of the electronics being located elsewhere. In the preferred embodiment, the optics module has an electrical connector for connection to a printed circuit board (PCB) which carries the electronic components such as the laser drive, the motor drive, the digitizer and the decoder.

FIGS. 12 to 14 show an exemplary design in which the optics module generally indicated at 950 comprises a variety of optical and mechanical components mounted to a base 952. Electrical connections 953 are provided for coupling the module to a PCB 954.

On the module base 952 is mounted a semiconductor laser 962 the output beam 963 of which passes through a focusing lens 964 before being internally reflected by a prism 966. The beam then passes through an aperture 968 in a collector 970 before impinging upon an oscillating scanning mirror 956 to provide an outgoing scanning laser beam 972. The scanning mirror 956 is arranged to oscillate over an angle of about 28° by virtue of the interaction between a fixed magnet 958 and an electromagnet coil 960. Light 974, reflected from the indicia, impinges back onto the scanning mirror 956 and onto the collector 970 which focuses it via an aperture 976 in a housing 978 to a photodetector 980.

Electrical connections, schematically illustrated at 953, 953' and 953", couple the optics module 950 to the PCB 954. The connections may include power connections, ground connections, signal/control connections, and drive connections for the coil 960 and the laser 962. Signal connections are also provided enabling the output from the photodetector 980 to be passed to the PCB 954.

On the PCB 954 are mounted the electronic circuits' 982 for operating the optics module 950. These may include, for example, the laser driver, the motor drive, the digitizer and the decoder.

Such an arrangement provides for an efficient and convenient manufacturing operation.

Figure 15:
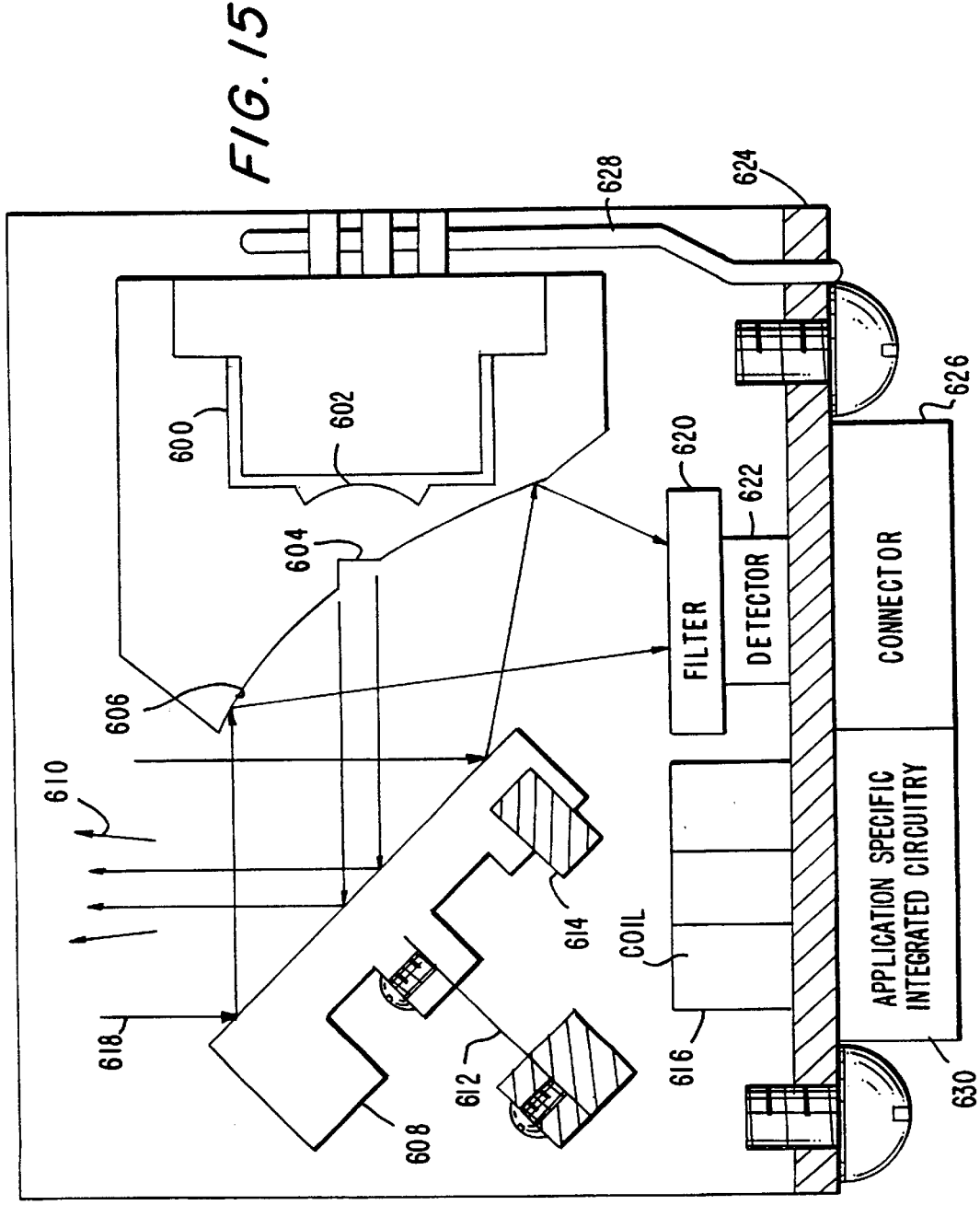
FIG. 15 is a view from one side of yet a further alternative embodiment.

An alternative optics module is shown schematically in FIG. 15. In this arrangement, outgoing laser light from a semiconductor laser 600 passes through a focusing lens 602, an aperture 604 in a collecting mirror 606 and impinges upon the scanning mirror 608 to form an outgoing scanning beam 610. The scanning mirror 608 is mounted on a Mylar strip 612, and is caused to oscillate by virtue of the interaction between a permanent magnet 614 and an electromagnetic driving coil 616.

Reflected light 618 from the indicia (not shown) being read first impinges once more onto the scanning mirror 608, and is then focused by means of the concave collection mirror 606 onto a filter 620 and photodetector 622 assembly.

The optical elements are mounted to a base 624 which carries an electrical connector 626 via which electrical signals can be transferred to and from the module. In particular, the connector 626 may carry power, ground lines, control signals, drive signals for the coil 616 and (via the additional coupling 628) for the laser 600. In addition, the connector 626 may include data lines for transferring from the module data signals representative of light received by the photodetector 622.

The base 624 may further include one or more application-specific integrated circuits 630.

In the embodiments of FIGS. 12 and 15, the modules may optionally include some or all of the required electronic components such as a digitizer and/or a decoder. In such a case, the module is self-contained and simply plugs into a generic PCB. The generic PCB then need not carry decode or digitizing circuitry.

Figure 6:
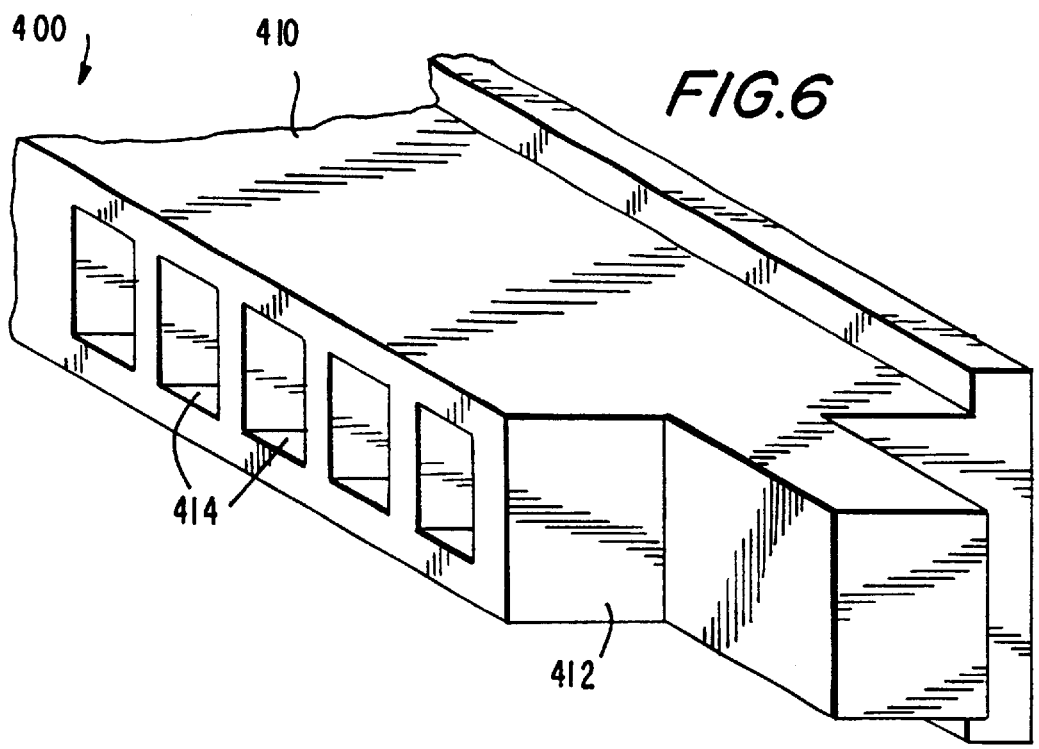
FIG. 6 shows an exemplary PCMCIA card connector, for use with any of the preceding embodiments.

In any of the preceding embodiments, the data and/or other connections may be made by way of a standard PCMCIA card connector, if desired. For example, in the embodiment of FIG. 4, the data lead 214 may be coupled to the PCB 212 via a PCMCIA card-type connector. Alternatively, the radio frequency transmitter 300 may also be coupled via this type of connector.

Where a PCMCIA card connector is used, the preferred arrangement is as shown in FIG. 6. In order to prevent radio frequency leakage from a PCMCIA package, the plastic PCMCIA connector is selectively coated with an appropriate conductive material such as silver, copper, nickel or gold ink or paint. Other conductive coatings could of course be envisaged such as, for example, the coating supplied by Acheson Colloids Company of Ontario, Canada, under product reference Electrodag 18DB70.

The coating covers the upper surface 410 of the connector, the lower surface 412 and the front surface 414. The coating at least partially continues inside some of the cavities, to make an electrical connection between the exterior coating and ground. According to the PCMCIA standard, socket positions 1, 34, 35 and 68 are grounded and the coating may extend into, and make electrical contact with ground within, any or all of these sockets.

In addition, coating is provided within the other contact load positions, but no electrical connection is made to the grounded exterior shell coating.

The electrically conductive coating is, in addition, in electrical contact with the PCMCIA top and bottom covers (not shown).

When used with a standard metal card frame assembly, this embodiment ensures substantial sealing of RF leakage out of the PCMCIA assembly.

Figure 7:
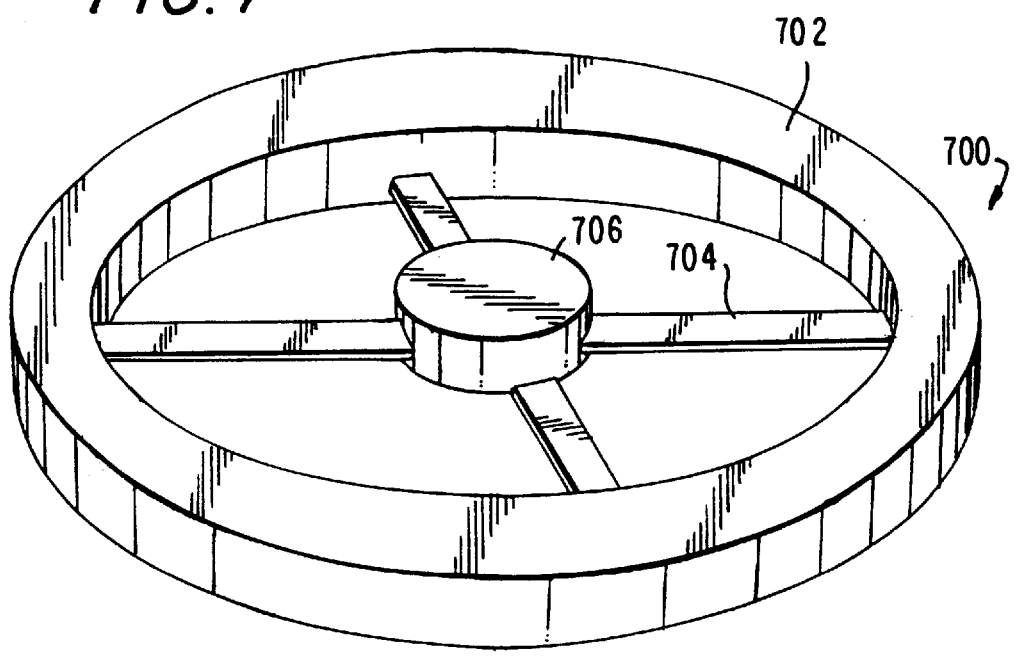
FIG. 7 shows, schematically, an abuse detector for portable electronic equipment.
Figure 8:
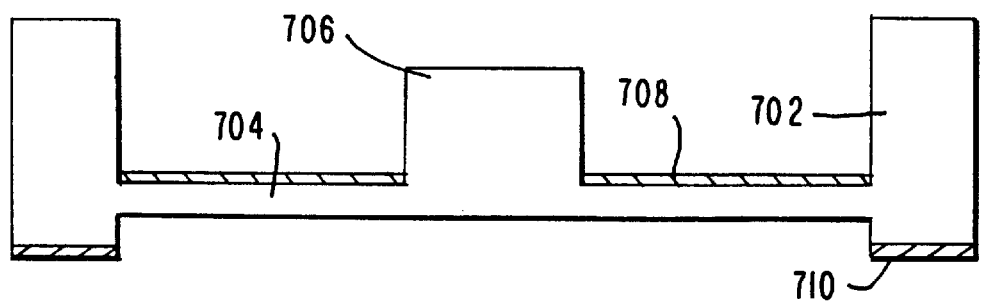
FIG. 8 is a longitudinal cross-section through the detector of FIG. 7.

The embodiment of FIGS. 4a and 4b may include an abuse-detector generally indicated by reference numeral 700, and illustrated in more detail in FIGS. 7 and 8 to which reference should now be made.

The abuse detector 700 comprises a molded plastics material ring 702, having inwardly-directed spokes 704 which support a central weight 706. The ring 702, the spokes 704 and the weight 706 may be all of one piece, as is illustrated in FIG. 8 which is a longitudinal cross-section along the central line of one of the spokes. Each spoke 704 is coated with a stress-sensitive coating 708. The unit is secured to a suitable support within the scanner, for example the PCB 212 in FIG. 4b, by means of an annular adhesive coating 708 applied to one side of the ring 702.

The coating 708 is chosen so that it visibly cracks when the equipment is subjected to a level of acceleration that exceeds the specified limits of use(e.g., 2000 g). This occurs by the twisting or longitudinal bending of the spokes 704 as the weight 706 moves slightly with respect to the ring 702. It will be noted from FIG. 8 that in the preferred embodiment the weight 706 is spaced slightly forwardly of the PCB, by virtue of a rearwardly-extending annular boss on the ring 702, thereby enabling the weight to move freely as the spokes bend and/or twist.

In an alternative embodiment (not shown) the ring 702 may be secured to a circular base, which may itself be attached, for example by means of an adhesive, to the PCB 212.

An abuse meter of the type illustrated in FIGS. 7 and 8 may be applied to any type of hand-held equipment, not only bar code readers. It may have particular application to hand-held computer terminals and like equipment which may, in a busy industrial or commercial environment, be liable to sustain accidental shocks.

Figure 9:
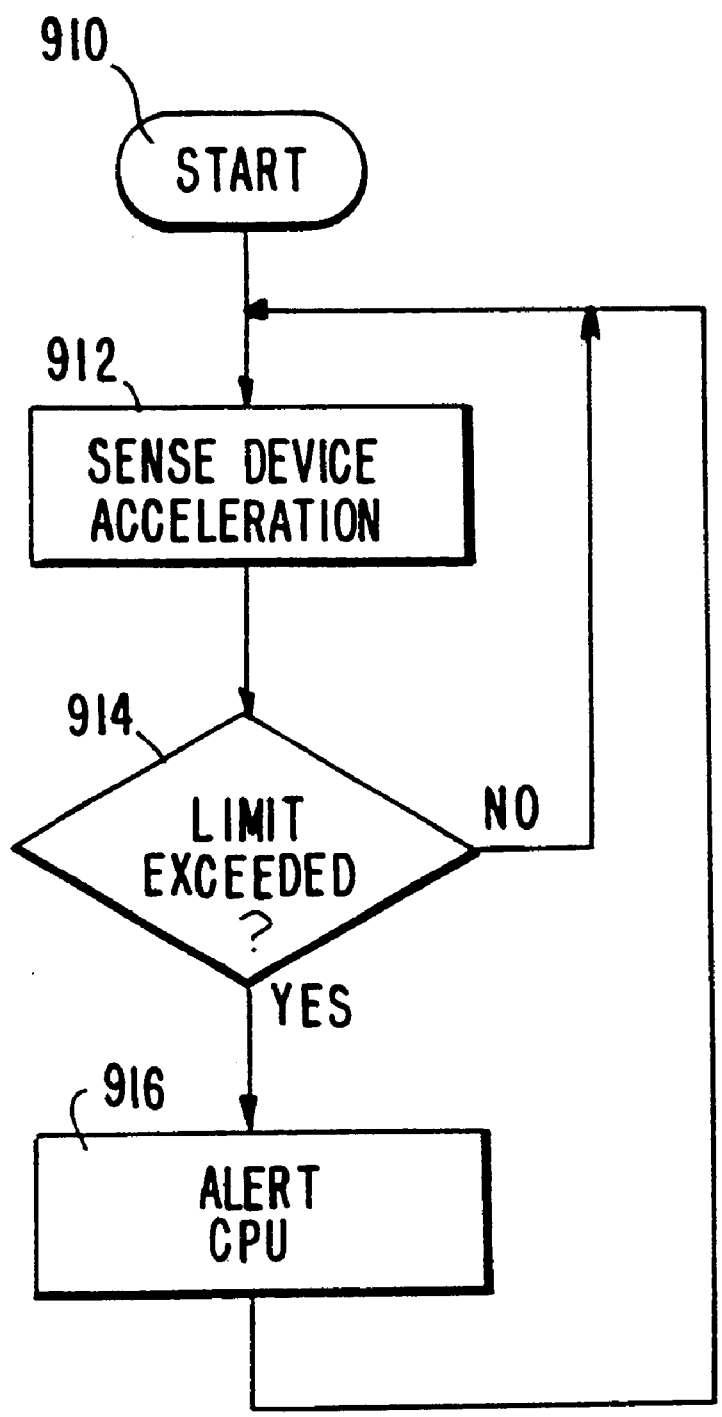
FIGS. 9 to 11 are flow diagrams illustrating a method of shock preparation in portable electronic equipment.
Figure 10:
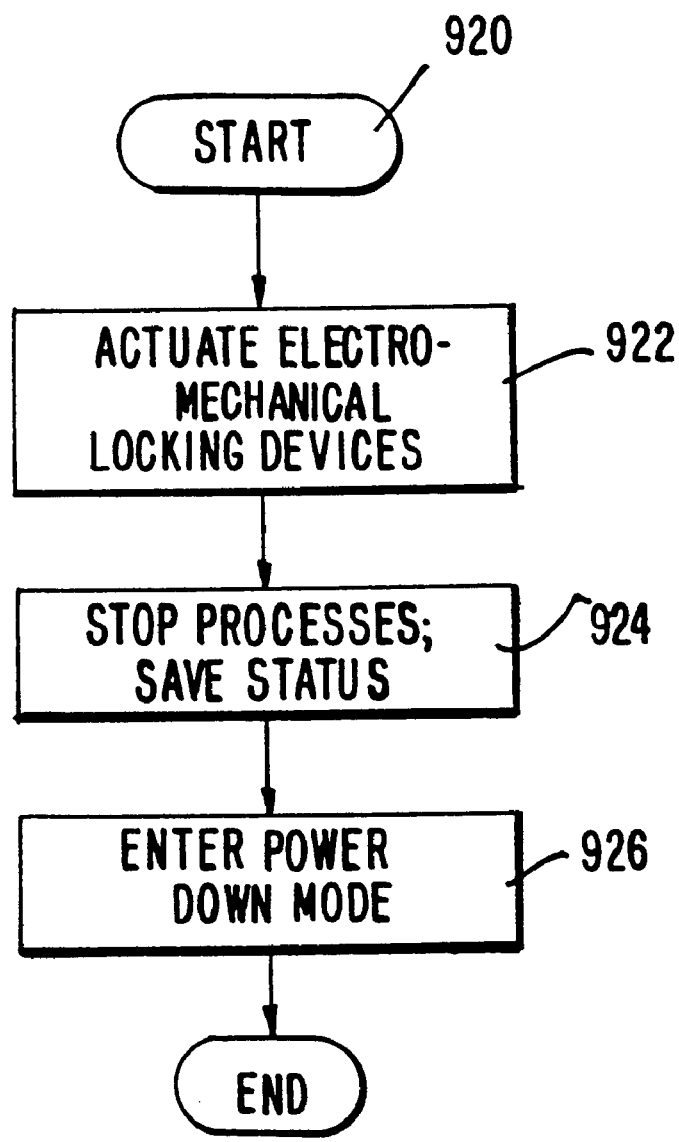
Figure 11:
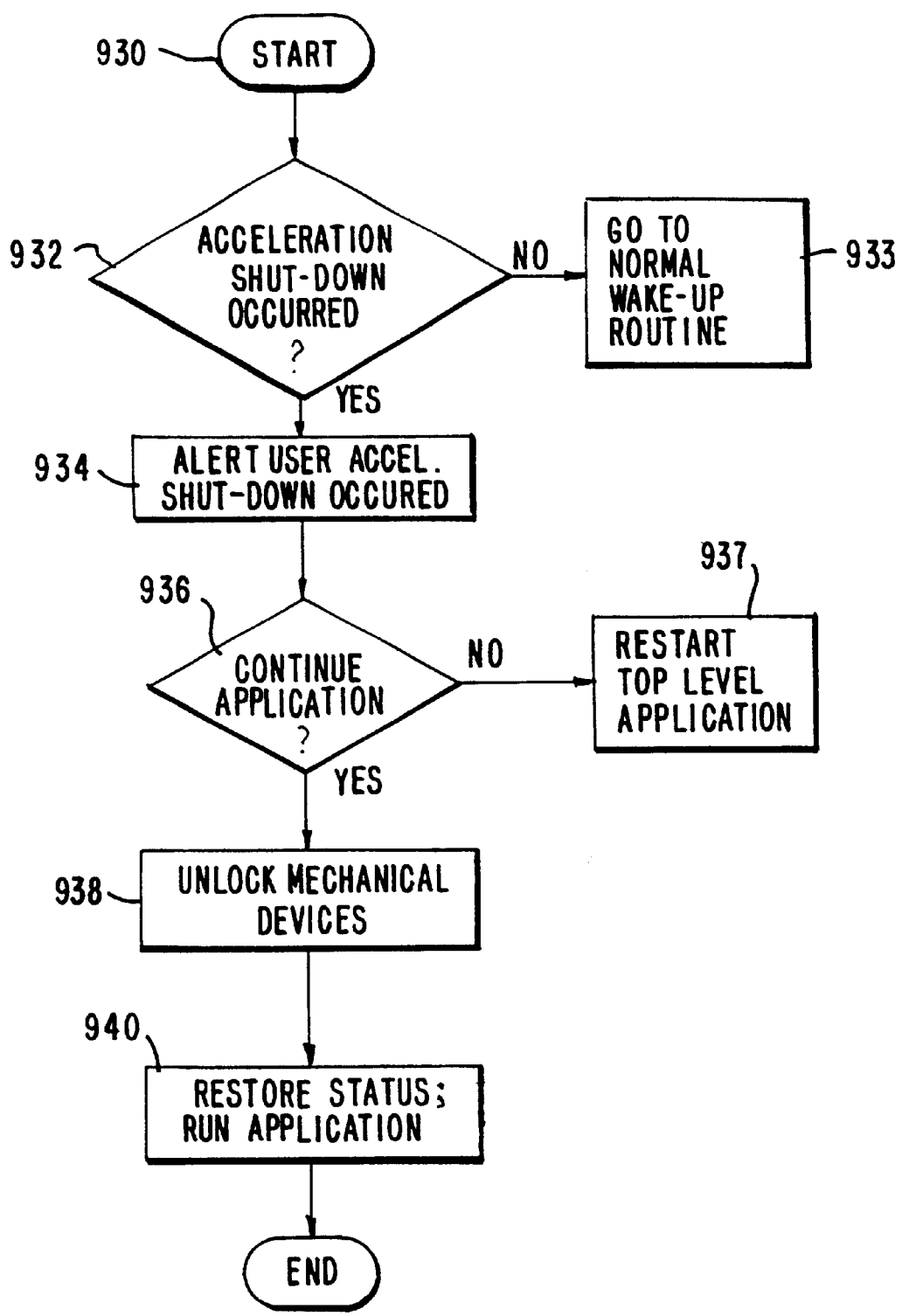

A rather more sophisticated approach to the problems of unexpected shock is illustrated in FIGS. 9 to 11. This proceeds from the recognition that although sudden shock, due for example to banging or dropping the device, may not cause permanent damage, it can cause interruption of the operation of the electrical process/software within. Such electronic interruptions may cause data and/or software program loss that may not be easily recoverable. Accordingly, the embodiment of FIG. 4b includes an accelerometer with associated circuitry 800 for sensing sudden acceleration of the device and for automatically causing the computer to pause or to shut down the current process before the possible shock causes loss of data and/or disruption of that process. A suitable accelerometer for use in all types of hand-held or portable computer peripherals is the Model 3031 accelerometer supplied by IC Sensors of Milpitas, Calif.

In operation, the accelerometer is designed to detect sudden accelerations, for example that caused when the device is dropped, and to alert the central processing unit (CPU) accordingly. The computer is therefore warned of a possible imminent shock, allowing all current processing to be frozen and for the electronics to be shut down before the shock occurs. At the time of the shock, no processing will be in progress, and hence no electronic information will be lost due to the shock. Of course, this does not preclude loss of capability of the device due to actual physical damage.

Upon indication that the device is accelerating, the CPU is arranged to enter a low-power "pause" mode in which the current processes, and the status conditions, are saved. After the impact, the user may reactivate the system and can continue the processing, from the point at which it was shut down, without loss of data.

Shock prediction may also be used to protect physical components from damage due to a sudden shock. Once the computer has been warned of the high acceleration rate, it may actuate electromechanical devices to provide additional mechanical protection. For example, a miniature disk drive can be locked before impact to provide additional protection to the drive head and platters.

It will be understood that acceleration-detection in three dimensions will typically be preferred, since the impact may occur at any angle. However, one-dimensional acceleration sensing could suffice if, in a particular application, protection from shock is needed only in a particular direction.

FIG. 9 shows the alerting algorithm in more detail. Starting at 910, acceleration of the device is continually monitored at 912 by the accelerometer 800 (FIG. 4b). When the accelerometer determines at step 914 that a threshold is exceeded, an alert is sent at 916 to the CPU, for appropriate action to be taken. The accelerometer then continues to monitor the acceleration level, so that it can signal a return to normal conditions. If the limit was not exceeded at step 914, monitoring simply continues.

FIG. 10 shows the flow of the CPU response to an acceleration alert. Starting at 920, the CPU first, at step 922, sends a message to actuate any electromechanical locking devices to prepare for the shock. At 924 the CPU then stops all current running programs, and saves the status information of those processes. Finally, at 926, the CPU puts the computer into a power-down or "sleep" mode.

The recovery from a power-down event caused by an acceleration alert is illustrated schematically in FIG. 11. Starting at 930, when the user wakes up the unit (via a keystroke or other input), the CPU then checks at 932 to see whether the power-down mode it is coming out of was due to an acceleration alert. If not, control then passes at 933 to the normal wake-up routine.

If the power-down was caused by an acceleration alert, the CPU informs the user at 934 that it experienced an acceleration shutdown. The system then asks whether the user wishes to continue the application from the point at which it was paused. The user's input is checked at 936, and if the user has decided not to continue from the point at which the process was paused, a top level routine 937 may then be initiated. On the other hand, if the user does decide to continue the application from the paused point, the electromechanical locks are removed at 938, and at 940 the process status information is re-installed and the application continued from the appropriate point.

Figure 16:
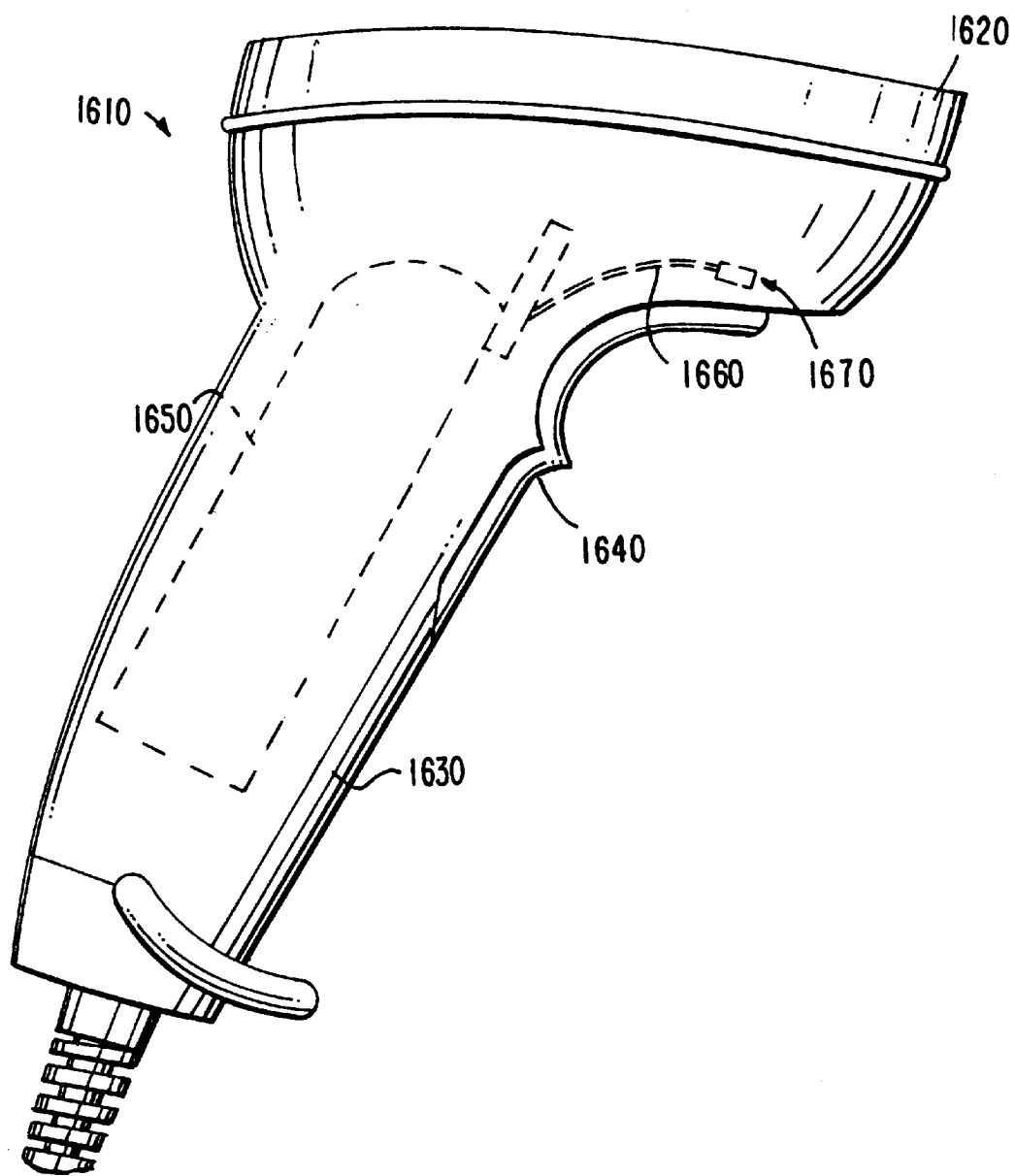
FIG. 16 shows a further exemplary housing, incorporating an accelerometer.

An alternative and yet more sophisticated approach is illustrated in FIGS. 16 to 19. FIG. 16 shows a hand-held scanner body 1610 having a head portion 1620 and a manually-graspable handle portion 1630. The internal scanning components (not shown) are actuated by means of a digitally-operated trigger 1640.

Mounted within the handle 1630 is a printed circuit board 1650 which is coupled by means of a flexible electrical connection 1660 to x, y and z accelerometers 1670, fixedly secured to the housing.

Figure 17:
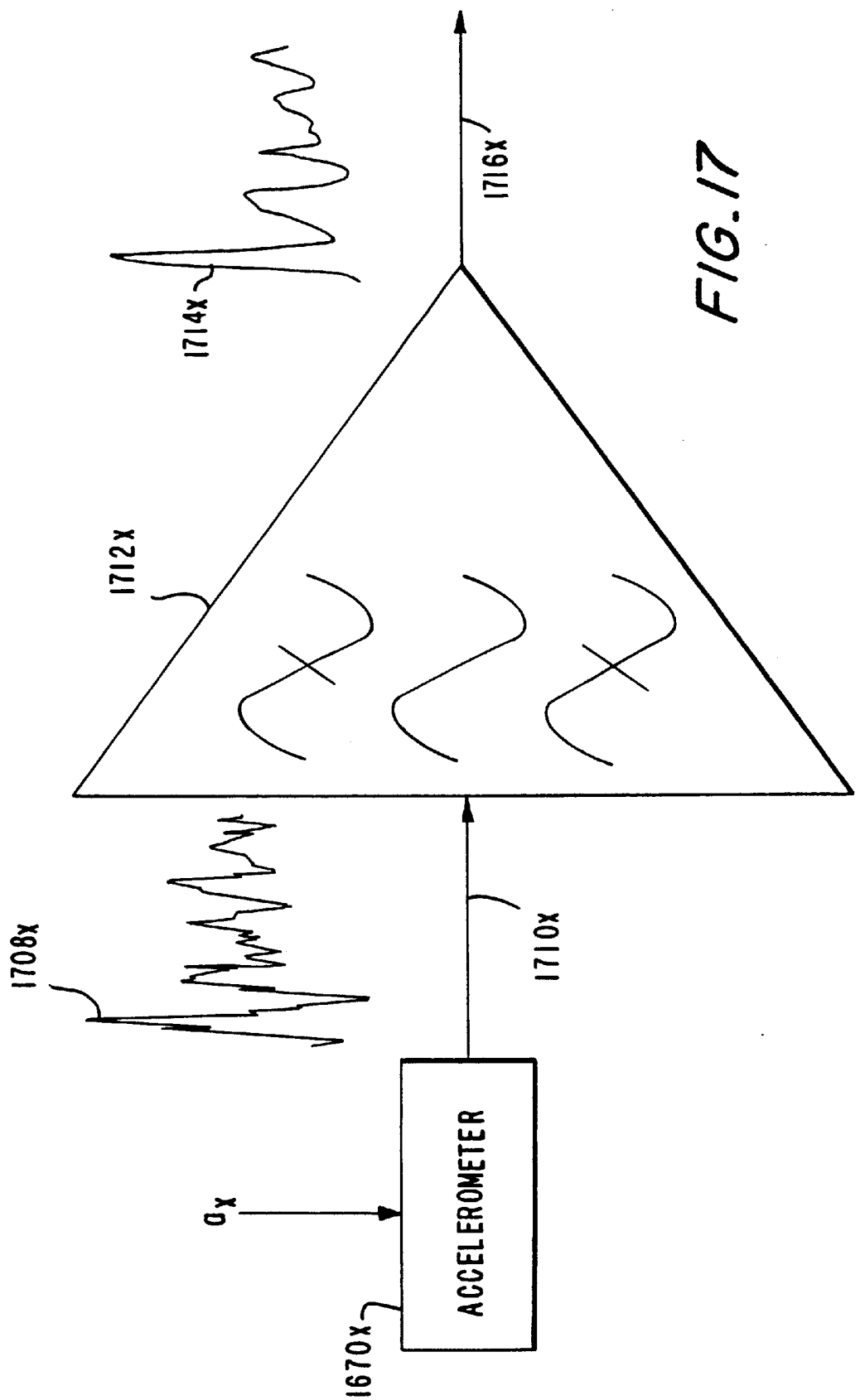
FIG. 17 shows how the accelerometer signal output is conditioned.
Figure 18:
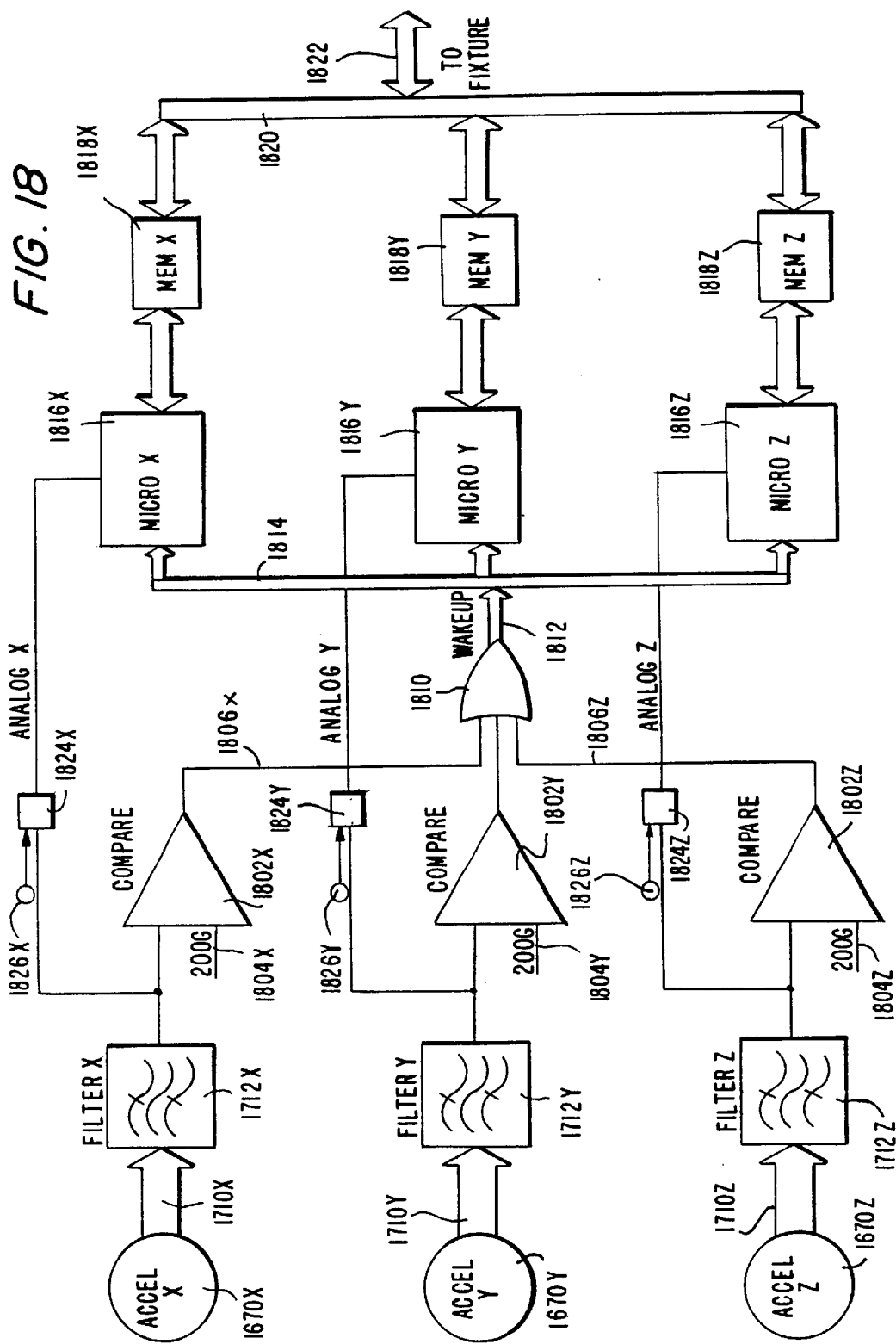
FIG. 18 shows the electronic circuitry associated with the embodiment of FIG. 16.

The PCB 1650 mounts electronic components, shown in FIGS. 17 and 18, for processing the signals received from the accelerometers 1670.

FIG. 17 illustrates the signal processing for the x-channel. An acceleration $a_x$ applied to the accelerometer 1670$x$ produces a raw output signal 1708$x$ on the accelerometer output 1710$x$. This signal is applied to an x-filter 1712$x$ which produces a smoothed output 1714$x$ on the filter output 1716$x$. The y and z channels are identical.

The three channels already described in connection with FIG. 17, may be seen on the left-hand side of FIG. 18. As shown in that drawing, the filter output for each channel is applied to one input of a comparator 1802. The other input, in each case, is a fixed voltage 1804 representative of an acceleration of 200 g. The respective comparator outputs 1806 are then applied to three respective inputs of a central OR-gate 1810. This accordingly creates a wake-up signal on an output 1812 when any one or more of the comparators 1804 have registered an acceleration in excess of 200 g. The wake-up signal on the line 1812 is placed on a bus 1814 which supplies the information respectively to x, y and z microprocessors 1816. Analog signals are also supplied to the respective microprocessors from the output of the x, y and z filters 1712. Each microprocessor has associated with it a corresponding memory 1818. The memories are coupled with a further bus 1820 to a common output port or data coupling 1822, whereby the information in the memories 1818 may be downloaded to a fixed central computer (not shown).

In operation, the individual outputs of the accelerometers are constantly monitored, and a "wake-up" signal is supplied on the line 1812 if any one or more of the accelerometers records an acceleration of greater than 200 g. In that event, data representative of the filter outputs are supplied to the respective microprocessors, and may be stored in the memories for further study or processing. The precise waveform which has triggered the "wake-up" signal on the line 1812 may still be recovered and stored in memory by virtue of its having been delayed in transit by a delay element 1824. The respective x, y and z delay elements may comprise standard delay lines, or may, more preferably, comprise EEPROMs, arranged to store the incoming signals on a temporary basis, and to pass them on if and only if a "wake-up" signal is generated. For example, each EEPROM may store waveforms relating to the most recent five second period, with previous time periods being constantly overwritten unless and until a "wake-up" signal is generated, in which case the waveforms are passed on to the microprocessors 1816. In an alternative embodiment (not shown) the EEPROMs may comprise part of the respective microprocessors 1816.

In a further development of the idea, additional sensors 1826 may be provided, for each channel, to supply additional information that may be useful to assist in the analysis of the waveforms. For example, it may under some circumstances be advantageous to retain information relating to the raw (pre-filtered) signals, and/or the x, y, z attitude of the equipment, over a period of time.

In addition, or alternatively, a further channel (not shown) may be provided for the storage of additional information such as the ambient temperature, the temperature of the laser diode, the on/off state of the scanner, the frequency/duration of use, or the state of various electronic or mechanical components. With this additional information, the device effectively acts as a "black-box" for an optical scanner, or other electronic equipment, allowing the manufacturer or other testing personnel access to a complete device log. If a user reports that a particular scanner has stopped working, or has developed a malfunction, it is then an easy matter to download the log via the connector 1822, and to investigate the device's recent history. It may for example may become evident from the log that the device has been subject to abusive treatment which has not been reported by the user.

Figure 19:
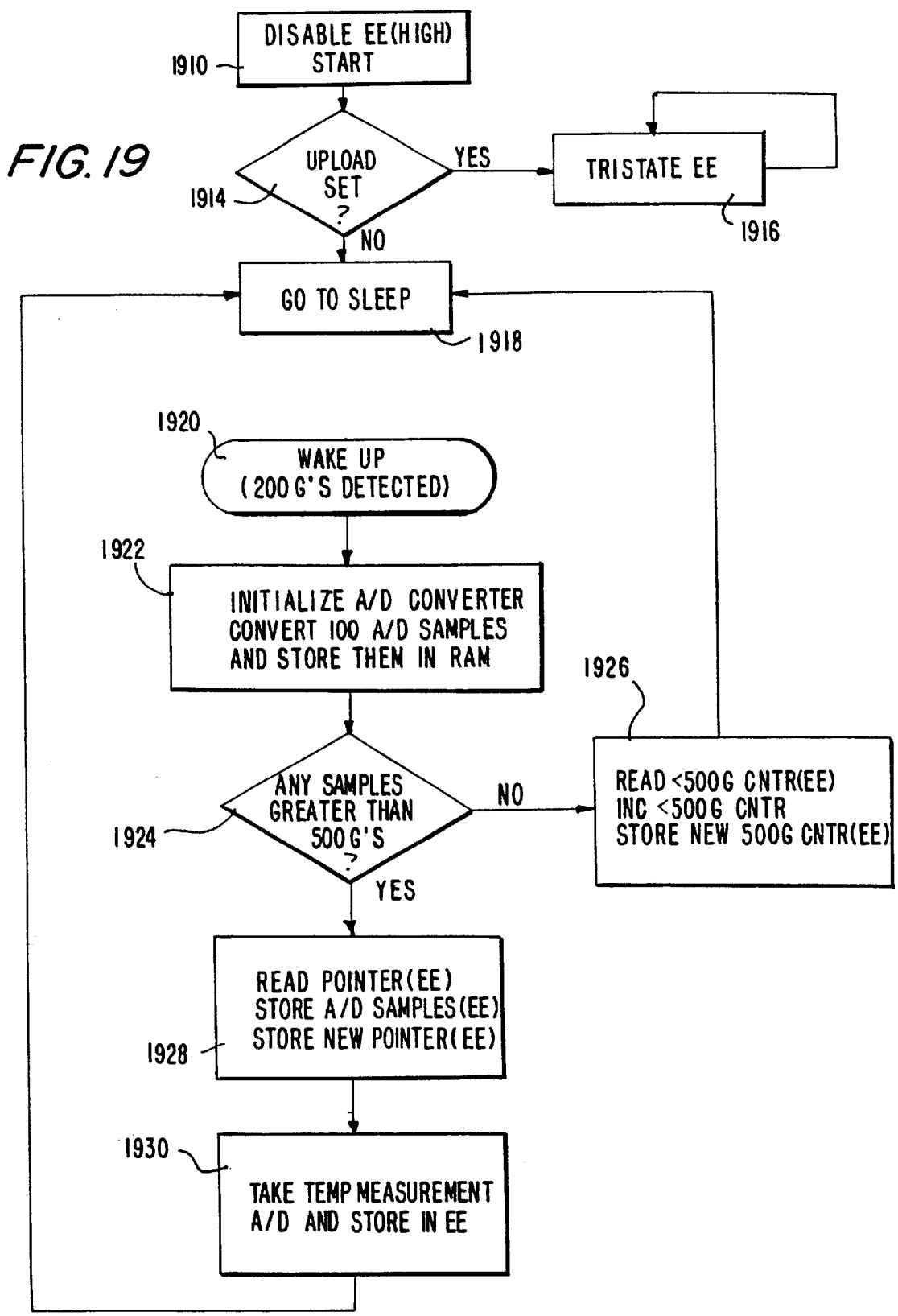
FIG. 19 illustrates the operation of the algorithm used in the FIG. 16 embodiment.

Turning now to FIG. 19, there is shown a preferred mode of operation, which differs slightly from that already discussed in connection with FIG. 18, in that the entire waveform is loaded into memory only if a deceleration of greater than 500 g has been detected; if the detected deceleration is between 200 and 500 g, the system simply makes a note of that fact.

At step 1910, the algorithm is launched as the scanner is powered up. If the user wishes to upload the information stored in the memories, he requests an upload at step 1914, and the upload is effected at 1916. In this diagram, "EE" represents an erasable EPROM.

If an upload has not been requested, the system goes into a suspended mode at 1918. It remains in that mode until a "wake-up" signal is supplied at 1920, this telling the system that at least one accelerometer has detected a deceleration of greater than 200 g (compare the "wake-up" signal on the line 1812 of FIG. 18).

At step 1922, an A/D converter is initialized, the corresponding waveform sampled at 100 sampling points, and the digital values stored in RAM. A check is then made at 1924 to see whether any of these samples are representative of decelerations greater than 500 g. If not, then control passes to box 1926. The current value of the counter representing decelerations of between 200 and 500 g is read, the value is incremented, and the new value is then stored in EE. Control then passes back to box 1918, to await a further "wake-up" signal.

If any samples of greater than 500 g are found at step 1924, control passes the box 1928. The entire digitized sample is then stored in EE, and the pointers updated, allowing the waveform to be reconstructed at a later stage. Other relevant information may then be stored, at 1930, such as for example the temperature. Control then returns to box 1918 and further activity is suspended until another "wake-up" signal is detected.

It will of course be appreciated that the equipment and processes described above, and illustrated in FIGS. 9 to 11 and 16 to 19 may find application in many types of portable equipment, not only bar code readers. Other applications include portable hand-held and notebook computers, computer terminals and other electronic equipment.

Figure 20:
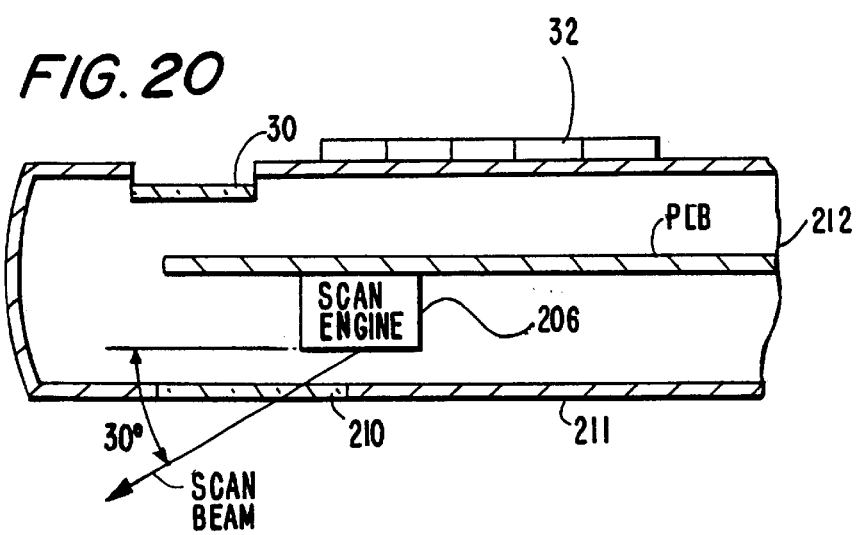
FIG. 20 shows another embodiment of the terminal of FIG. 1b.

FIG. 20 depicts a terminal analogous to the one shown in FIG. 1b in that it has a display 30 and a keypad 32. However, the window is not located at the front, but instead a window 210 is located on a bottom wall 211. The scan module or engine 206 is mounted on the PCB 212 such that the outgoing laser scan beam exits the housing at an acute angle on the order of 30° relative to the horizontal. The scan beam is not perpendicular or parallel to any outer wall of the terminal, or to the PCB 212.

Figure 21:
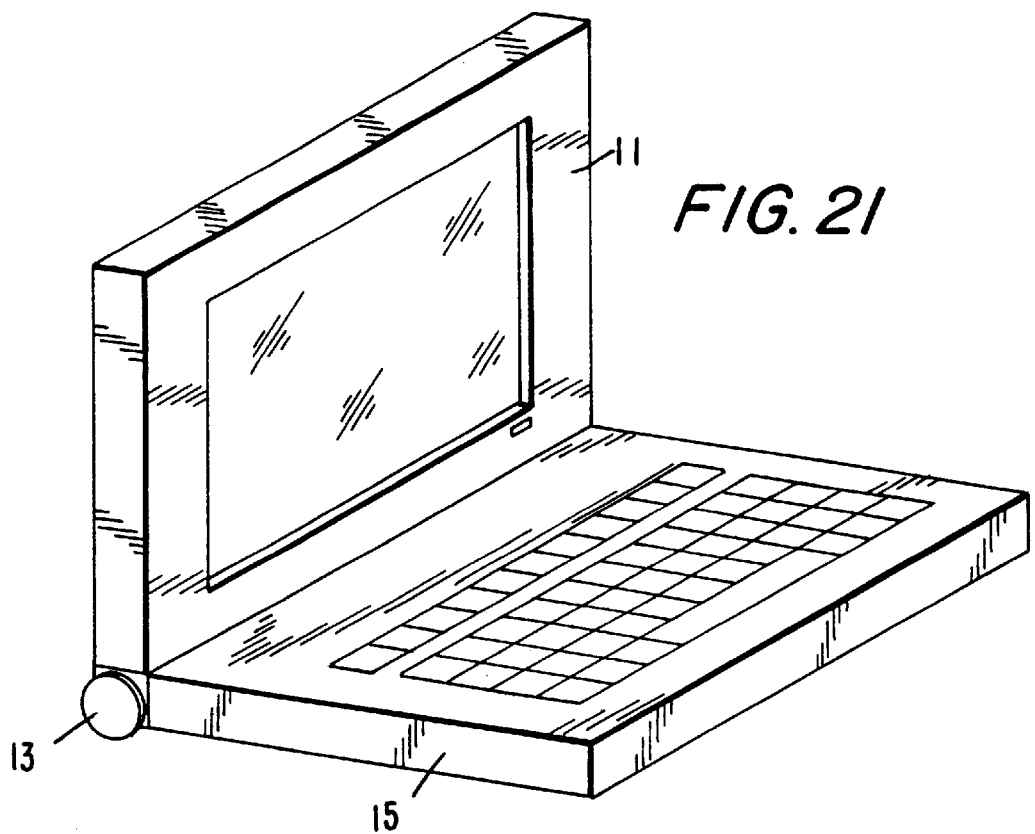
FIG. 21 shows a shock-protected electronic device.

Since hand-held electronic devices are subject to a considerable amount of mechanical stress due to dropping to hard surfaces, etc., it is important that the housing be designed in a durable manner. Another feature of the present invention, as shown in FIG. 21, is to provide an external housing of a hand held device such as a lap top computer, a bar code reader, etc., comprised of three distinct sections or components, namely an upper housing 11, a middle housing 13, and a lower housing 15, although such sections may be any three (or more) segments or regions of the housing. The upper housing and the lower housing are made of a relatively rigid thermoplastic such as ABS/PC while the middle housing which separates the upper housing and lower housing, is preferably made from a "semi-rigid" thermoplastic elastometer such as Texin® (Texin® is a trademark of Miles Inc., of Pittsburgh, Pa., relating to a family of urathane thermo plastic materials). We use the term "semi-rigid" to describe Texin as a material that is a cross between an elastometer, with the properties of high strain and low set and a standard theremoplastic, with the properties of high rigidity and brittleness.

The shape and design of the housing is such that the middle housing is the first point of contact on a side load that might typically occur when the reader is dropped. This portion of the housing, when made from Texin, is capable of sustaining relatively large strains without experiencing permanent deformation. The large deflection serves to gradually slow down the impact against sensitive internal components, hence, reducing the shock load, much the same way that an internal shock mounting system such as rubber bumpers, would.

The housing can easily be designed to allow the energy absorbent properties of the middle housing to work for a load directed onto the upper housing and a soft boot or "foot" typical of the handle portion of a gun-shaped bar code reader, would be needed for a bottom load. Another important difference in this design is that the optical assembly can be rigidly mounted to the lower housing for accurate mechanical registration. This reduces the likelihood of the common problem of alignment of a "soft mounted" or suspending optical assembly to the housing. An additional benefit is the fact that the Texin® material has enough compressibility to provide a moisture and dust proof seal when fastened snugly to the other portions of the housing. Thus, if sealing is desired, the need for a separate gasket is eliminated.

It will be understood that each of the elements described above, or two or more together, may also find useful applications in other types of constructions which differ from those specifically described above. Elements described in connection with one embodiment may, where compatible, be combined with those described in connection with another embodiment.

While the invention has been illustrated and described as embodied in a high speed scanning arrangement, it is not intended to be limited to the details shown, since various modifications and structural changes may be made without departing in any way from the spirit or scope of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the appended claims.

I claim:

1. A hand-held reader for electro-optically reading indicia, comprising:
   a) a gun-shaped housing having a hollow, upper body portion extending along a body axis, and a hollow, lower handle portion connected to, and extending along a handle axis downwardly away from, the body portion;
   b) a generally planar, printed circuit board mounted in the housing and being the sole printed circuit board within the housing, the sole board having an upper region located within the body portion, and a lower region located within the handle portion, the sole board extending between the upper and lower regions in a direction transversely of the body axis;
   c) a light-transmissive window located in the body portion;
   d) a scan module mounted at the upper region of the sole board, for scanning light passing through the window; and
   e) a coupler mounted at the lower region of the sole board and being in electrical communication with the scan module.

2. The reader of claim 1, wherein the body axis and the handle axis form an obtuse angle.

3. The reader of claim 1, wherein the body portion has a front end region at which the window is located, and a rear end region spaced along the body axis away from the front end region; and wherein the sole board extends into the rear end region of the body portion.

4. The reader of claim 1, wherein the sole board is perpendicular to the body axis.

5. The reader of claim 1, wherein the window is inclined relative to the body axis.

6. The reader of claim 1, wherein the scan module is operative for directing a light beam through the window to the indicia to be read, for sweeping the light beam across the indicia, for detecting light reflected off the indicia, and for generating an electrical signal corresponding to the indicia from the light detected.

7. The reader of claim 6, further comprising a signal processor on the sole board for processing the electrical signal to obtain data corresponding to the indicia.

8. The reader of claim 7, wherein the coupler is operative for transmitting the data away from the housing.

9. The reader of claim 1, further comprising a battery pack mounted on the sole board for supplying electrical power to the scan module.

10. The reader of claim 1, wherein the coupler is an electrical connector connected to a cable for bidirectional communication with the scan module.

11. The reader of claim 1, wherein the coupler is a wireless transceiver for bidirectional communication with the scan module.

12. The reader of claim 1, further comprising a trigger on the housing for manually initiating reading, the trigger including a trigger switch mounted on the sole board in an intermediate region located between the upper and lower regions of the sole board.

13. The reader of claim 1, wherein the scan module and the coupler are surface-mounted on the sole board.

14. The reader of claim 1, wherein the handle portion has front and rear walls spaced apart along the longitudinal direction, and a pair of side walls spaced apart and extending between the front and rear walls along the longitudinal direction; and wherein the sole board extends between the side walls.

15. The reader of claim 1, wherein the scan module includes a laser for generating a laser beam.

* * * * *